United States Patent
Kaler et al.

(10) Patent No.: US 11,029,936 B2
(45) Date of Patent: Jun. 8, 2021

(54) DEPLOYING PACKAGES TO DEVICES IN A FLEET IN STAGES

(71) Applicant: Microsoft Technology Licensing, LLC, Redmond, WA (US)

(72) Inventors: Christopher G. Kaler, Sammamish, WA (US); Ashish Munjal, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/381,582

(22) Filed: Apr. 11, 2019

(65) Prior Publication Data

US 2020/0326923 A1    Oct. 15, 2020

(51) Int. Cl.
| | |
|---|---|
| G06F 9/44 | (2018.01) |
| G06F 8/65 | (2018.01) |
| G06N 20/00 | (2019.01) |
| G06N 3/08 | (2006.01) |

(52) U.S. Cl.
CPC ............... *G06F 8/65* (2013.01); *G06N 3/08* (2013.01); *G06N 20/00* (2019.01)

(58) Field of Classification Search
CPC ........................................................ G06F 8/65
USPC ......................................................... 717/169
See application file for complete search history.

(56) References Cited

U.S. PATENT DOCUMENTS

| | | | | |
|---|---|---|---|---|
| 7,353,389 B2* | 4/2008 | DeFuria | ............ | G06F 8/64 713/168 |
| 7,865,889 B1* | 1/2011 | Bird | ............ | G06F 8/60 717/168 |
| 8,060,585 B2* | 11/2011 | Waud | ............ | G06F 8/656 709/221 |

(Continued)

FOREIGN PATENT DOCUMENTS

| | | |
|---|---|---|
| WO | 2015165111 A1 | 11/2015 |
| WO | 2016149080 A1 | 9/2016 |

OTHER PUBLICATIONS

Yoji Yamato; "Server Selection, Configuration and Reconfiguration Technology for IaaS Cloud with Multiple Server Types"; Journal of Network and Systems Management (2018).*

(Continued)

*Primary Examiner* — Francisco J Aponte
(74) *Attorney, Agent, or Firm* — Ranjeev Singh; Singh Law, PLLC

(57) ABSTRACT

Systems and methods for deploying packages to devices in a fleet in stages are provided. A method includes first scanning hardware configured to handle functions unrelated to the customer workloads in a first stage to determine whether a selected diversity target for deploying the package is met. The method further includes, if the selected diversity target for deploying the package is not met, then scanning hardware configured to handle at least a subset of the customer workloads in a second stage to determine whether the selected diversity target for deploying the package is met. The method further includes, if the selected diversity (Continued)

target for deploying the package is met after the scanning, then using the processor, deploying the package to the first subset of the set of devices in the first stage and to a second subset of the set of devices in the second stage.

17 Claims, 18 Drawing Sheets

(56) References Cited

U.S. PATENT DOCUMENTS

| | | | | |
|---|---|---|---|---|
| 8,135,775 | B1* | 3/2012 | Anderson | G06F 8/61 709/203 |
| 8,966,475 | B2* | 2/2015 | Srinivasan | G06F 9/5077 717/174 |
| 8,984,104 | B2* | 3/2015 | Morgan | H04L 41/0806 709/220 |
| 9,088,479 | B2* | 7/2015 | Heninger | G06F 11/3419 |
| 9,442,769 | B2* | 9/2016 | Ferris | G06F 9/505 |
| 9,456,057 | B2* | 9/2016 | Marr | H04L 67/42 |
| 9,645,808 | B1* | 5/2017 | Turpie | G06F 8/65 |
| 9,696,982 | B1* | 7/2017 | Michalik | G06F 8/65 |
| 9,703,890 | B2* | 7/2017 | Kakaraddi | H04L 41/12 |
| 9,792,099 | B2* | 10/2017 | Zhang | G06F 8/65 |
| 9,858,068 | B2* | 1/2018 | Gibson | G06F 9/45533 |
| 9,906,578 | B2* | 2/2018 | Aliminati | H04L 12/4641 |
| 9,934,027 | B2* | 4/2018 | Shine | G06F 8/70 |
| 9,946,879 | B1* | 4/2018 | Sharifi Mehr | G06F 16/381 |
| 9,996,335 | B2* | 6/2018 | Grover | G06F 8/65 |
| 10,097,621 | B2* | 10/2018 | Jung | G06F 8/60 |
| 10,146,524 | B1 | 12/2018 | Killmon et al. | |
| 10,162,619 | B1* | 12/2018 | Lanner | G06F 8/61 |
| 10,257,268 | B2* | 4/2019 | Cencini | H04L 67/1042 |
| 10,268,574 | B2* | 4/2019 | Siggers | G06F 11/3692 |
| 10,318,265 | B1* | 6/2019 | To | G06F 8/61 |
| 10,318,287 | B2* | 6/2019 | Hamill | G06F 8/60 |
| 10,320,625 | B1* | 6/2019 | Cherumbath | G06F 21/629 |
| 10,372,421 | B2* | 8/2019 | Mack | G06F 8/20 |
| 10,476,736 | B2* | 11/2019 | Nair | G06F 11/1423 |
| 10,528,516 | B2* | 1/2020 | Remis | G06F 9/44505 |
| 10,534,595 | B1* | 1/2020 | Lisuk | G06F 9/54 |
| 10,540,608 | B1* | 1/2020 | Dirac | G06F 9/50 |
| 10,542,091 | B2* | 1/2020 | Jahr | H04L 67/1097 |
| 10,581,675 | B1 | 3/2020 | Iyer | |
| 10,649,759 | B1* | 5/2020 | Delange | G06F 11/1433 |
| 10,719,301 | B1 | 7/2020 | Dasgupta et al. | |
| 10,732,967 | B1* | 8/2020 | Kolazhi | G06F 8/71 |
| 2006/0080413 | A1* | 4/2006 | Oprea | G06F 8/61 709/220 |
| 2007/0118654 | A1* | 5/2007 | Jamkhedkar | H04L 41/0806 709/226 |
| 2007/0240143 | A1* | 10/2007 | Guminy | G06F 8/70 717/168 |
| 2008/0103996 | A1 | 5/2008 | Forman et al. | |
| 2008/0256219 | A1 | 10/2008 | Zhang et al. | |
| 2008/0306798 | A1* | 12/2008 | Anke | G06Q 10/06316 705/7.26 |
| 2009/0320019 | A1 | 12/2009 | Ellington et al. | |
| 2010/0306364 | A1* | 12/2010 | Terry | H04L 12/66 709/224 |
| 2011/0004564 | A1* | 1/2011 | Rolia | G06Q 10/067 705/348 |
| 2011/0271275 | A1* | 11/2011 | Ochi | G06F 8/63 717/177 |
| 2013/0103841 | A1 | 4/2013 | Werth et al. | |
| 2013/0179876 | A1* | 7/2013 | Aliminati | H04L 63/0209 717/177 |
| 2013/0191842 | A1* | 7/2013 | Sripathi Panditharadhya | G06F 9/5083 718/105 |
| 2013/0198354 | A1* | 8/2013 | Jones | G06F 8/63 709/223 |
| 2014/0033188 | A1* | 1/2014 | Beavers | G06F 8/65 717/170 |
| 2014/0130036 | A1* | 5/2014 | Gurikar | G06F 8/61 717/176 |
| 2014/0208314 | A1* | 7/2014 | Jeswani | G06F 8/65 718/1 |
| 2014/0325503 | A1* | 10/2014 | Li | G06F 11/3433 717/177 |
| 2014/0337830 | A1* | 11/2014 | Schwaninger | G06F 8/63 717/177 |
| 2014/0359556 | A1* | 12/2014 | Jujare | G06F 8/20 717/104 |
| 2015/0019204 | A1 | 1/2015 | Simard et al. | |
| 2015/0178063 | A1* | 6/2015 | Narkinsky | G06F 8/65 717/168 |
| 2015/0381711 | A1 | 12/2015 | Singh et al. | |
| 2016/0013992 | A1* | 1/2016 | Reddy | G06F 8/61 709/224 |
| 2016/0019043 | A1* | 1/2016 | Ramasamy | G06F 8/65 717/171 |
| 2016/0092185 | A1 | 3/2016 | Botti et al. | |
| 2016/0092207 | A1* | 3/2016 | Chhatwal | H04L 41/082 717/121 |
| 2016/0269319 | A1* | 9/2016 | Wise | H04L 47/823 |
| 2017/0061348 | A1* | 3/2017 | Mack | G06Q 10/06313 |
| 2017/0315796 | A1* | 11/2017 | Melnik | G06F 16/16 |
| 2018/0046453 | A1* | 2/2018 | Nair | G06F 8/60 |
| 2018/0048520 | A1* | 2/2018 | Nair | H04L 43/16 |
| 2018/0048521 | A1* | 2/2018 | Nair | G06F 9/44589 |
| 2018/0091624 | A1* | 3/2018 | Forbes | H04L 67/36 |
| 2018/0165122 | A1* | 6/2018 | Dobrev | G06F 8/60 |
| 2018/0225095 | A1* | 8/2018 | Kamalakantha | G06F 9/45533 |
| 2018/0267787 | A1 | 9/2018 | Rathinasabapathy et al. | |
| 2018/0321719 | A1 | 11/2018 | Munjal et al. | |
| 2018/0373961 | A1* | 12/2018 | Wang | H04L 41/145 |
| 2019/0037337 | A1* | 1/2019 | Ahmed | H04W 4/80 |
| 2019/0065165 | A1 | 2/2019 | Troutman et al. | |
| 2019/0102700 | A1* | 4/2019 | Babu | G06N 5/025 |
| 2019/0155614 | A1* | 5/2019 | York | H04L 67/34 |
| 2019/0163593 | A1* | 5/2019 | Agetsuma | G06F 11/302 |
| 2019/0207869 | A1* | 7/2019 | Wise | H04L 47/822 |
| 2019/0229987 | A1* | 7/2019 | Shelke | G06F 9/45558 |
| 2019/0286491 | A1* | 9/2019 | Bohacek | G06F 9/5061 |
| 2019/0294525 | A1* | 9/2019 | Scheiner | G06F 11/3608 |
| 2019/0294563 | A1* | 9/2019 | Remis | G06F 11/3031 |
| 2019/0311298 | A1 | 10/2019 | Kopp et al. | |
| 2019/0347668 | A1 | 11/2019 | Williams et al. | |
| 2020/0019393 | A1* | 1/2020 | Vichare | G06F 8/60 |
| 2020/0104113 | A1* | 4/2020 | Grill | H04W 48/18 |
| 2020/0326919 | A1 | 10/2020 | Kaler et al. | |

OTHER PUBLICATIONS

"Unified Extensible Firmware Interface Specification", Published by Unified EFI Forum, Inc, Version 2.7, May 2017, 2899 Pages.

Dugar, et al., "Tutorial: Manage your connected devices in bulk", Retrieved from: https://docs.microsoft.com/bs-latn-ba/azure/iot-accelerators/iot-accelerators-remote-monitoring-bulk-configuration-update?view=sql-server-2017, Nov. 29, 2018, 17 Pages.

Ehlen, Tim, "Enterprise cloud control plane planning", Retrieved from: https://azure.microsoft.com/mediahandler/files/resourcefiles/enterprise-cloud-control-plane-planning/Enterprise%20Cloud%20Control%20Plane%20Planning.pdf, Oct. 16, 2018, 16 Pages.

Kohli, et al., "Install Update 5 on your StorSimple device", Retrieved from: https://docs.microsoft.com/en-us/azure/storsimple/storsimple-8000-install-update-5, Nov. 13, 2017, 20 Pages.

McSwain, et al., "Tutorial: Implement a device firmware update process", Retrieved from: https://docs.microsoft.com/en-us/azure/iot-hub/tutorial-firmware-update, Jun. 28, 2019, 15 Pages.

Platon, et al., "Introduction to Service Fabric health monitoring", Retrieved from: https://docs.microsoft.com/en-us/azure/service-fabric/service-fabric-health-introduction, Feb. 28, 2018, 15 Pages.

"International Search Report and Written Opinion Issued in PCT Application No. PCT/US2020/025057", dated Aug. 7, 2020, 11 Pages.

"Non Final Office Action Issued in U.S. Appl. No. 16/381,665", dated May 14, 2020, 17 Pages.

(56) References Cited

OTHER PUBLICATIONS

"Non Final Office Action Issued in U.S. Appl. No. 16/381,665", dated Nov. 30, 2020, 22 Pages.
"International Search Report and Written Opinion Issued in PCT Application No. PCT/US2020/025049", dated Sep. 22, 2020, 12 Pages.

* cited by examiner

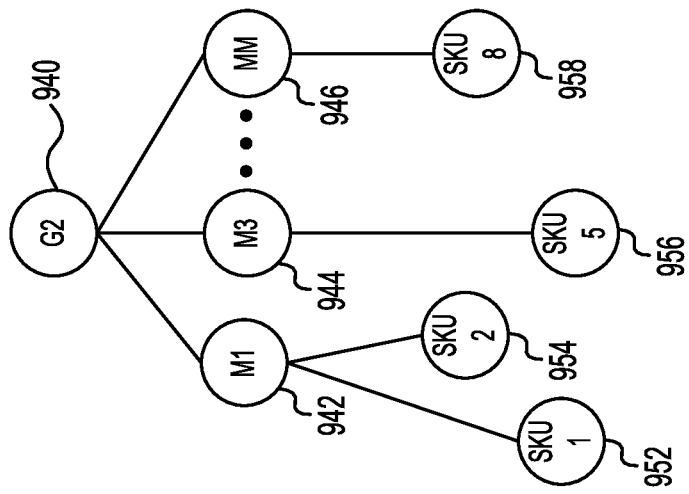
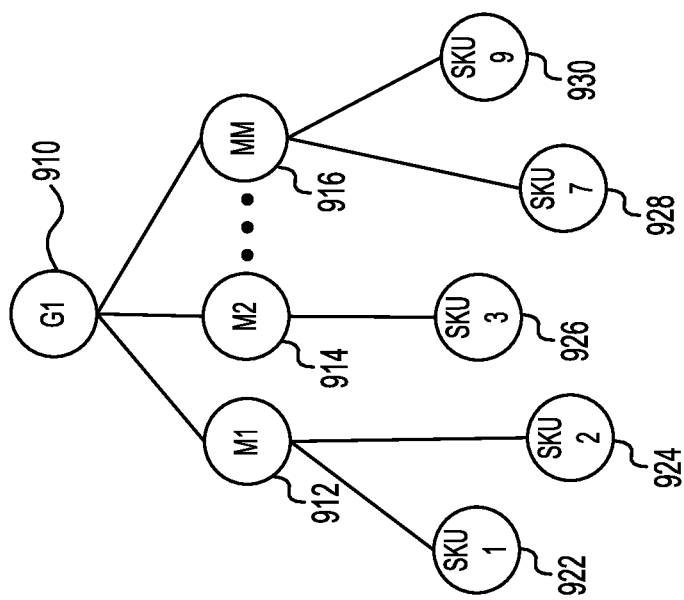
FIG. 9

| | PACKAGE TYPE | MICROCODE (1240) | UEFI/BIOS (1242) | BMC (1244) | SSD (1246) | HDD (1248) | FPGA PLATFORM (1250 / 1254) | FPGA IMAGE (1252 / 1256) |
|---|---|---|---|---|---|---|---|---|
| 1210 IMPACT TYPE | | | | | | | | |
| 1212 CPU PAUSE | | <Xs | <Xs | | | | <Xs | |
| 1214 STORAGE PAUSE | | | | | <Ys | <Zs | | |
| 1216 NETWORK PAUSE | | | | | | | <Fs | |
| 1218 FPGA PAUSE | | | | | | | <Ps | IMAGE-SPECIFIC |
| 1220 REBOOT | | | YES | | SOME | SOME | YES | |
| 1222 INCREASED POWER | | LOW | LOW | | LOW | LOW | MED | IMAGE-SPECIFIC |
| 1224 DECREASED PERFORMANCE | | LOW | LOW | | LOW | LOW | | |
| 1226 THERMAL IMPACT | | LOW | LOW | LOW | | | | |

DEPLOYING PACKAGES TO DEVICES IN A FLEET IN STAGES

BACKGROUND

Deploying packages, including firmware or other low-level system code, to components in a fleet comprising hardware corresponding to a cloud is difficult. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers.

The data centers include not only servers, but also other components, such as networking switches, routers, and other appliances. The servers and other components may be provided by different vendors and may include different types or versions of motherboards, CPUs, memory, and other devices. Apart from compute, network, and storage components, data centers further include other components, such as chassis, racks, power supply units, and other such components.

Each of these devices may need low-level system code, including firmware. Deploying packages to a wide variety of devices potentially distributed over many data centers across the world is challenging. Thus, there is a need for methods and systems for deploying packages to the devices in the fleet.

SUMMARY

In one example, the present disclosure relates to a method for deploying a package to a set of devices in a fleet comprising hardware configurable to perform functions related to customer workloads. The method may include first scanning hardware in a first stage to determine whether a selected diversity target for deploying the package is met, where the first stage comprises hardware configured to handle functions unrelated to the customer workloads. The method may further include, if the selected diversity target for deploying the package is met after the first scanning, then using a processor, deploying the package to a first subset of the set of devices in the first stage based on instructions associated with the package. The method may further include, if the selected diversity target for deploying the package is not met after the first scanning, then scanning hardware in a second stage to determine whether the selected diversity target for deploying the package is met, where the second stage comprises hardware configured to handle at least a subset of the customer workloads. The method may further include, if the selected diversity target for deploying the package is met after the scanning, then using the processor, deploying the package to the first subset of the set of devices in the first stage and to a second subset of the set of devices in the second stage based on the instructions associated with the package.

In another example, the present disclosure relates to a method for deploying a package to a set of devices in a fleet comprising hardware configurable to perform functions related to customer workloads. The method may include first scanning hardware in a first stage to determine whether a selected diversity target for deploying the package is met, where the first stage comprises hardware configured to not handle any workloads. The method may further include, if the selected diversity target for deploying the package is not met after the first scanning, then scanning hardware in a second stage to determine whether the selected diversity target for deploying the package is met, where the second stage comprises hardware configured to handle a first selected number of the customer workloads. The method may further include, if the selected diversity target for deploying the package is not met after the scanning, then scanning a third stage to determine whether the selected diversity target for deploying the package is met, where the third stage comprises hardware configured to handle a second selected number of the customer workloads, where the second selected number is greater than the first selected number. The method may further include, if the selected diversity target for deploying the package is met after scanning the third stage, using the processor, deploying the package to a first subset of the set of devices in the first stage, a second subset of the set of devices in the second stage, and a third subset of the set of devices in the third stage based on the instructions associated with the package.

In yet another example, the present disclosure relates to a system for deploying a package to a set of devices in a fleet comprising hardware configurable to perform functions related to customer workloads. The system may be configured to first scan hardware in a first stage to determine whether a selected diversity target for deploying the package is met, where the first stage comprises hardware configured to handle functions unrelated to the customer workloads. The system may further be configured to, if the selected diversity target for deploying the package is met after the first scan, then deploy the package to a first subset of the set of devices in the first stage based on instructions associated with the package. The system may further be configured to, if the selected diversity target for deploying the package is not met after the first scan, then scan hardware in a second stage to determine whether the selected diversity target for deploying the package is met, where the second stage comprises hardware configured to handle at least a subset of the customer workloads. The system may further be configured to, if the selected diversity target for deploying the package is met after the scan, then deploy the package to the first subset of the set of devices in the first stage and to a second subset of the set of devices in the second stage based on the instructions associated with the package.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 9 shows a diagram of scanning trees for the hardware in one stage in accordance with one example;

FIG. 12 shows an impact table in accordance with one example;

DETAILED DESCRIPTION

Examples described in this disclosure relate to creating and deploying packages including a payload to a fleet. Certain examples relate to creating and deploying packages based on operations derived from a machine learning model. Deploying packages, including firmware or other low-level system code, to components in a fleet, including hardware, in the cloud is difficult. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers.

The data centers include not only servers, but also other components, such as networking switches, routers, and other appliances. The servers and other components may be provided by different vendors and may include different types or versions of motherboards, CPUs, memory, and other devices.

Each of these devices may need low-level system code, including firmware. Deploying packages to a wide variety of devices potentially distributed over many data centers across the world is challenging. This is because the deployment of the packages needs to be done safely, securely, and reliably. There are several external factors that impact the safety, security, and reliability goals. As an example, there are generally more deployments than can be managed at a single time, especially when some have high-impact potential. There are certain types of changes or targets that require explicit agreement from other parties which gate the deployment (e.g. potential power or performance impacts). Moreover, the impact of deployment of the packages may need to be monitored to ensure safe and reliable deployment. Finally, often the payloads include firmware or other code sourced from other companies and must be evaluated and tested to ensure security.

To ensure safe, secure, and reliable deployment of the packages, certain examples of this disclosure relate to ensuring quality payloads, appropriate validation and testing, and monitoring of impacts on the fleet. Certain examples relate to using machine learning to improve the creation and the deployment of the packages.

Figure 1:
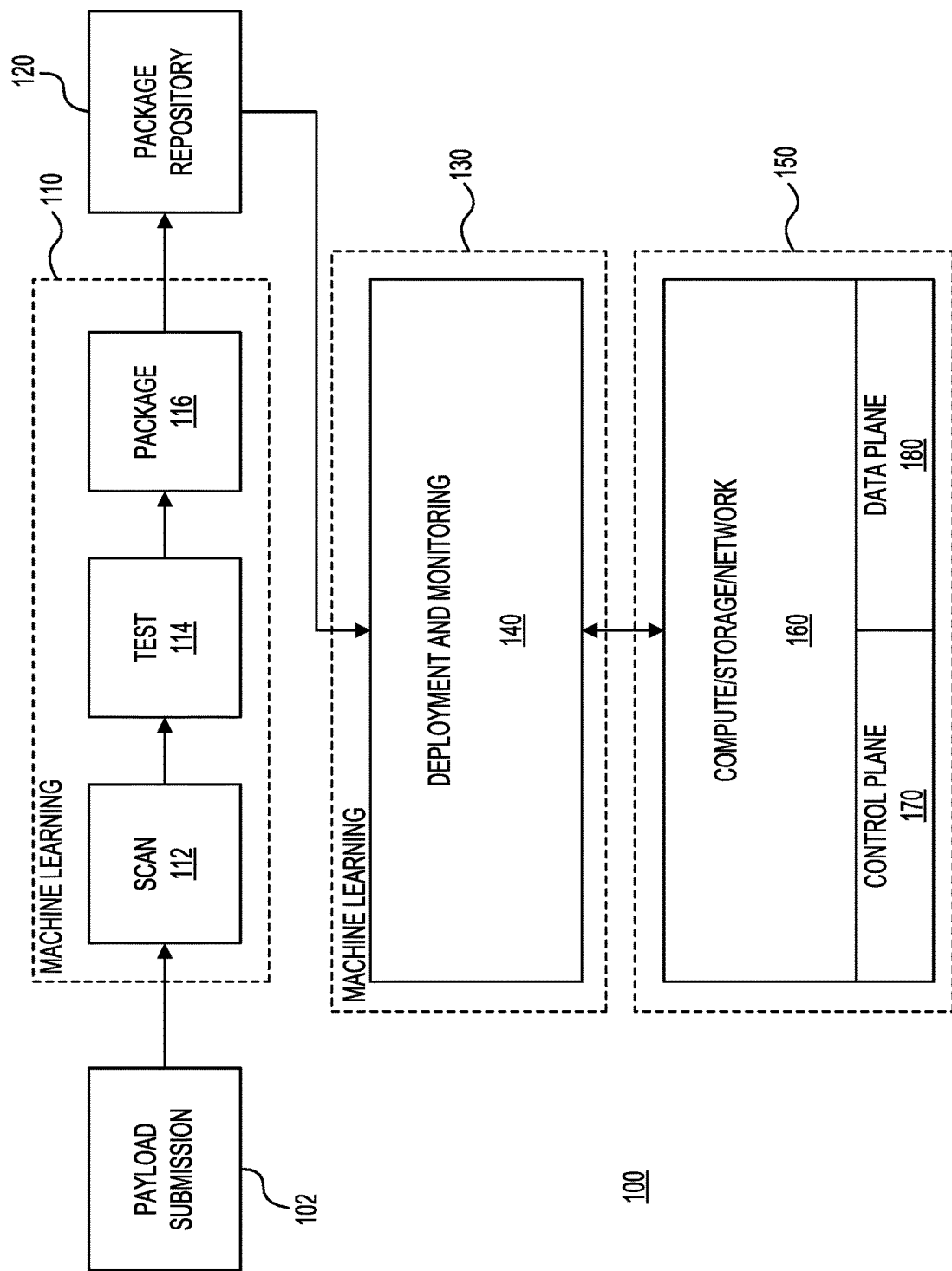
FIG. 1 shows a diagram of a system environment for deploying packages to devices in a fleet including hardware in a cloud in accordance with one example.

FIG. 1 shows a diagram of a system environment 100 for deploying packages to devices in a fleet including hardware in a cloud in accordance with one example. Examples of devices include, but are not limited to, baseboard management controllers (BMCs), CPUs, GPUs, FPGAs, FPGA instances, rack managers/controllers, chassis managers/controllers, power supply unit controllers, storage devices (e.g., SSDs or HDDs), networking devices (e.g., switches, routers, firewalls, and bridges), or any other devices in a data center that may require updates. The packages may include payloads, which may include instructions, low-level system code, firmware, settings, configuration, or other information that may need updating. System environment 100 may include payload submission 102, package creation 110, package repository 120, deployment and monitoring 140, compute/storage/network 160, control plane 170, data plane 180. Machine learning or other automated techniques may be used with package creation 110, deployment and monitoring 140, and compute/storage/network 160, control plane 170, data plane 180.

With continued reference to FIG. 1, package creation 110 may include scan 112, test 114, and package 116. In this example, a payload may be received via payload submission 102. Payload submission 102 may be implemented using a self-service portal for payload engineering teams. Thus, in this example, payload submission 102 may provide a graphical user interface via which any payload may be submitted. As part of payload submission 102, a variety of relevant information may be obtained and stored in a database (e.g., database 212 associated with deployment and monitoring). The information may be obtained by presenting a questionnaire to the submitter. Alternatively, or additionally, the information may be included as metadata associated with the payload. The information may include deployment, changes, testing, and impact related information. The payload related information, or any information derived from the submitted information, is referred to as parameters associated with the payload.

Still referring to FIG. 1, scan 112 may include scanning the payload for various parameters associated with the payload. As an example, metadata associated with the payload may be scanned and extracted as part of this process. The extracted information may be processed to determine whether it meets submission criteria. Compliance with the submission criteria may indicate that the submission is a valid submission. After the submission is validated, the extracted information may be stored as records in a database associated with deployment and monitoring 140. The information may also be timestamped. Scan 112 may further include scanning the payload for any viruses or other undesirable artifacts. Test 114 may include testing the payload by using the payload to update certain targeted devices to ensure that the payload when installed will work as intended. Package 116 may include packaging the payload. Additional steps involved as part of this process are described in other portions of the disclosure.

With continued reference to FIG. 1, as shown by dotted box 130, machine learning may be used to deploy machine learning models associated with deployment and monitoring 140. Similarly, as shown by dotted box 150, machine learning may be used to deploy machine learning associated with compute/storage/network 160, control plane 170, and data plane 180. Additional details regarding the use of such machine learning models are provided in other portions of the disclosure.

Figure 2:
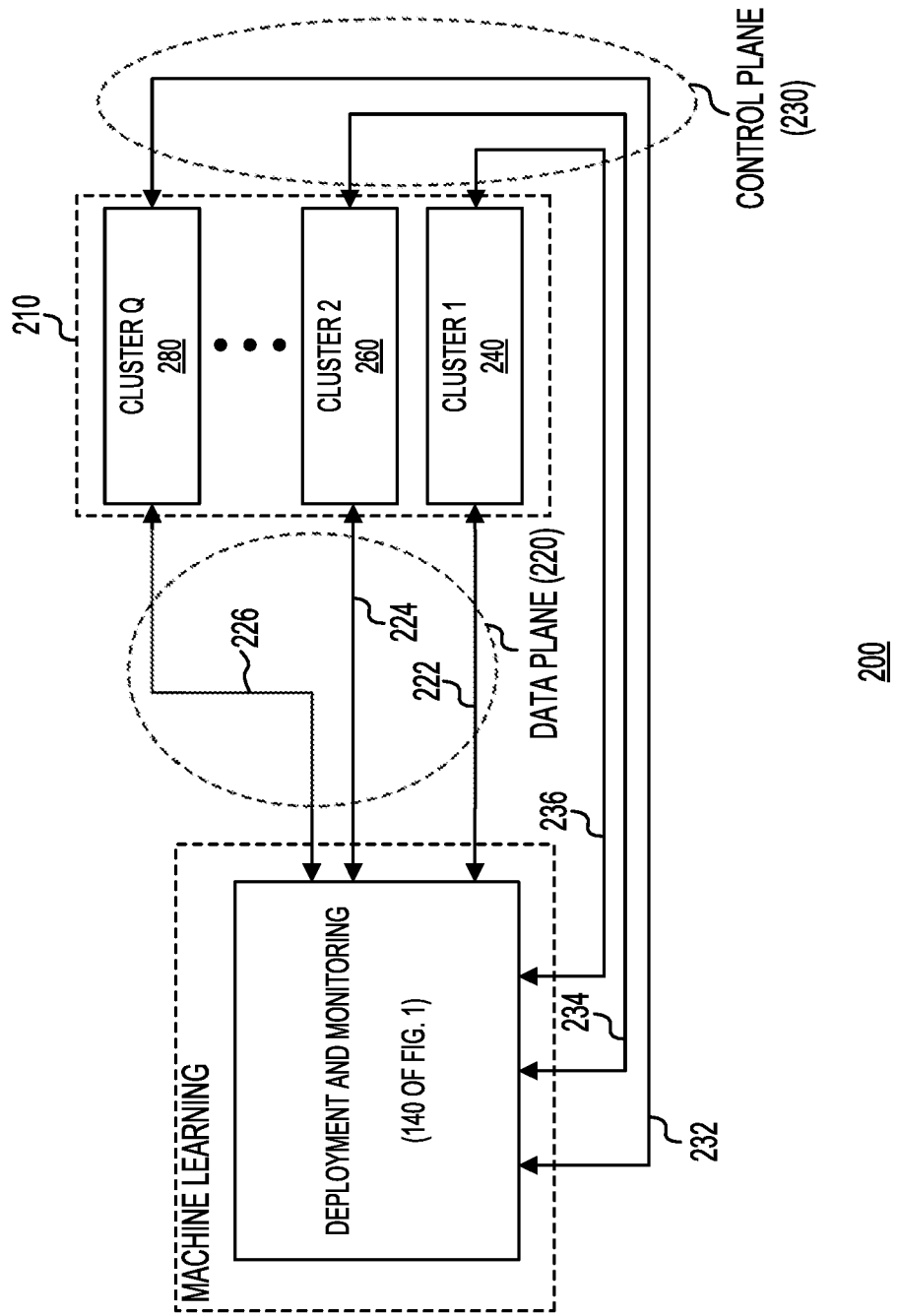
FIG. 2 is a block diagram of a system including deployment and monitoring of a fleet in accordance with one example.

FIG. 2 is a block diagram of a system 200 including deployment and monitoring (e.g., deployment and monitoring 140 of FIG. 1) and a fleet 210 in accordance with one example. As used in this disclosure, the term fleet may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. Deployment and monitoring 140 may be coupled via a data plane 220 to fleet 210. Deployment and monitoring 140 may be coupled via a control plane 230 to fleet 210. Fleet 210 may include one or more data centers, which in turn may include clusters of compute/storage/network devices. Thus, in this example, fleet 210 may include cluster 1 240, cluster 2 260, and cluster Q 280, where Q may be an integer greater than 1. Cluster 1 240 may be coupled via a bus 222 to deployment and monitoring 140; cluster 2 260 may be coupled via bus 224 to deployment and monitoring 140; and cluster Q 280 may be coupled via bus 226 to deployment and monitoring 140. Cluster 1 240 may be coupled via bus 232 to deployment and monitoring 140; cluster 2 260 may be coupled via bus 234 to deployment and monitoring 140; and cluster Q 280 may be coupled via bus 236 to deployment and monitoring 140. As shown in FIG. 2, machine learning may be coupled to deployment and monitoring 140. Additional details associated with the machine learning are provided later in the disclosure. Although not shown in FIG. 2, deployment and monitoring 140 may be coupled via any number of intervening networks (e.g., wide area networks, optical networks, wireless networks, wired networks, or other types of networks) to any of the clusters shown in FIG. 2. Thus, the term bus as used in this disclosure includes, but is not limited to, signal lines, signal lines coupled via routers, switches, other networking equipment, signal lines coupled via networks of any kind, wireless connections, a combination of signal lines and wireless connections, switch fabrics, or the like. Although FIG. 2 shows a certain number of clusters of a fleet 210 arranged in a certain manner, fleet 210 may include additional or fewer clusters. In addition, although FIG. 2 shows a certain arrangement of deployment and monitoring 140 in relation to fleet 210, deployment and monitoring 140 may be arranged differently, including in parts that are distributed over several locations and are interconnected via different types of networks or buses.

Figure 3:
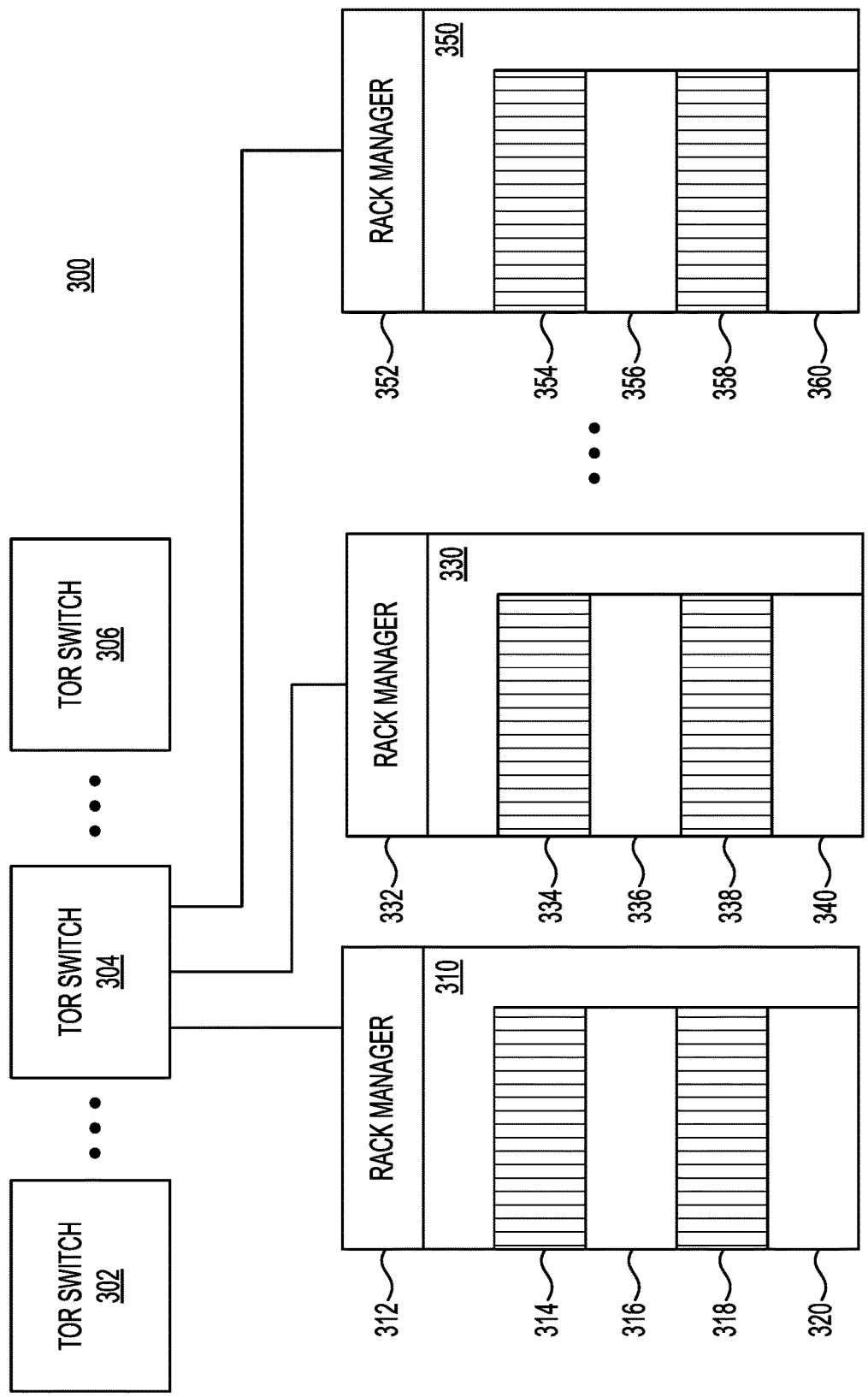
FIG. 3 is a block diagram of a cluster in a data center in accordance with one example.

FIG. 3 is a block diagram of a cluster 300 in a data center in accordance with one example. Cluster 300 may be one of the clusters included in a fleet that is managed using deployment and monitoring 140. In this example, cluster 300 may include top-of-the-rack (TOR) switches that may be used to interconnect racks of hardware components. Thus, cluster 300 may include TOR switches 302, 304, and 306. Each TOR switch may couple at least some of the components in cluster 300. As an example, TOR switch 304 may interconnect rack 310, rack 330, and rack 350. Each rack may include a rack manager and several chassis that may include components, such as servers, network storage, networking hardware (e.g., switches, routers, and bridges), or the like. Rack 310 may include several chassis, including for example chassis 314, 316, 318, and 320. Similarly, rack 330 may include several chassis, including for example chassis 334, 336, 338, and 340. Also, rack 350 may include several chassis, including for example chassis 354, 356, 358, and 360. Each rack may include a rack manager configured to interface with the deployment and monitoring systems, such as deployment and monitoring 140. Thus, rack 310 may include rack manager 312, rack 330 may include rack manager 332, and rack 350 may include rack manager 352. Each chassis may include servers organized in groups, such as blades. Some or all of the chassis may include networking and storage devices as well. Each chassis may also include fans to providing cooling air to the servers or other components housed within the chassis. Although FIG. 3 shows certain arrangement of racks, switches, chassis, and components within the chassis, the systems and methods disclosed herein are not limited to any particular arrangement. Thus, the systems and methods apply to any organization of a data center with respect to both data and control planes.

Figure 4:
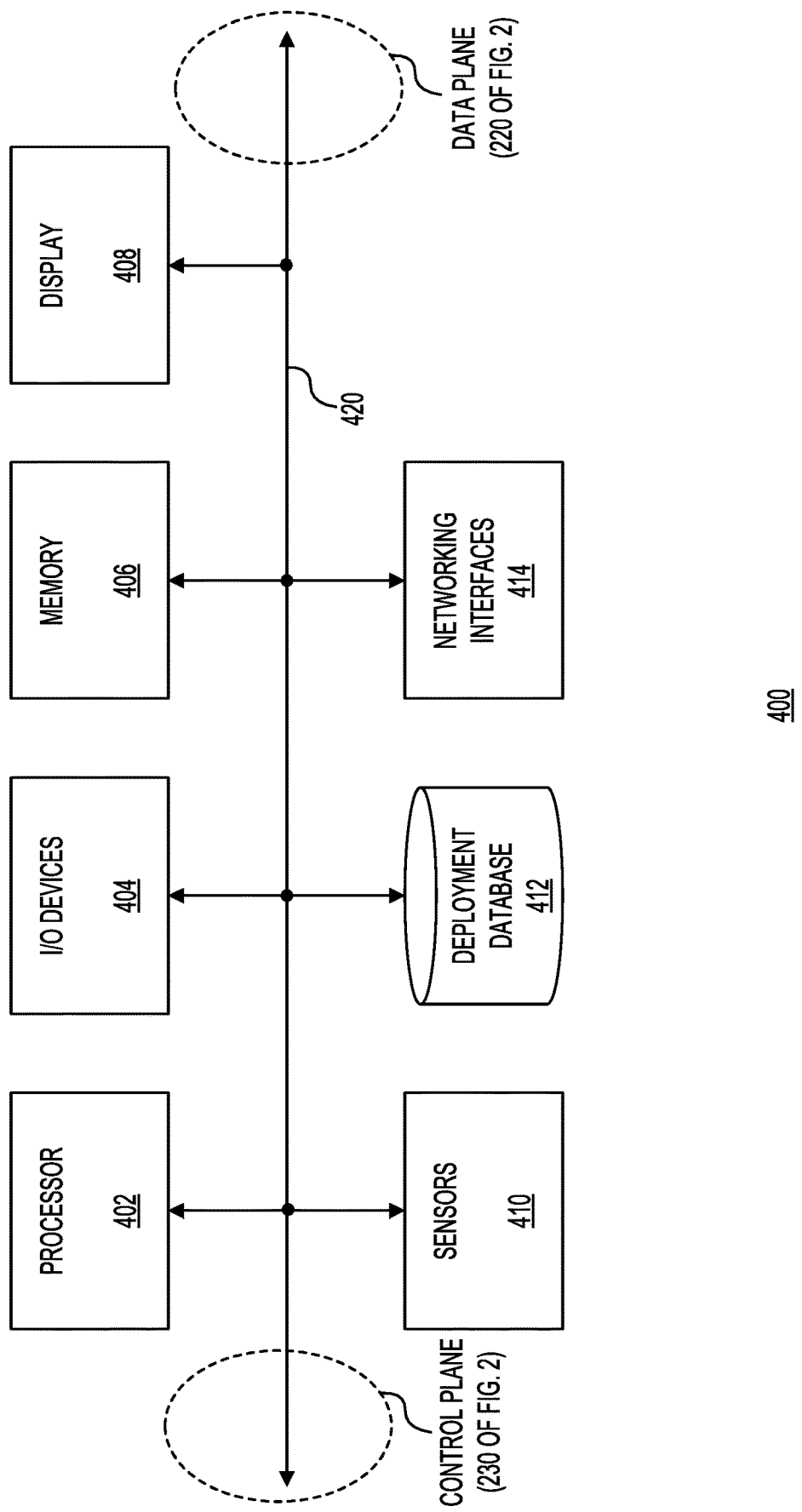
FIG. 4 shows a block diagram of deployment and monitoring in accordance with one example.

FIG. 4 shows a block diagram of deployment and monitoring 400 (e.g., deployment and monitoring 140 of FIG. 1) in accordance with one example. Deployment and monitoring 400 may include a processor 402, I/O devices 404, memory 406, display 408, sensors 410, deployment database 412, and networking interfaces 414, which may be interconnected via bus 420. Processor 402 may execute instructions stored in memory 406. I/O devices 404 may include components such as a keyboard, a mouse, a voice recognition processor, or touch screens. Memory 406 may be any combination of non-volatile storage or volatile storage (e.g., flash memory, DRAM, SRAM, or other types of memories). Display 408 may be any type of display, such as LCD, LED, or other types of display. Sensors 410 may include telemetry or other types of sensors configured to detect, and/or receive, information (e.g., conditions associated with the devices). Sensors 410 may include sensors configured to sense conditions associated with CPUs, memory or other storage components, FPGAs, motherboards, baseboard management controllers, or the like. Sensors 410 may also include sensors configured to sense conditions associated with racks, chassis, fans, power supply units (PSUs), or the like. Sensors 410 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

With continued reference to FIG. 4, sensors 410 may be implemented in hardware, software, or a combination of hardware and software. Some sensors 410 may be implemented using a sensor API that may allow sensors 410 to receive information via the sensor API. Software configured to detect or listen to certain conditions or events may communicate via the sensor API any conditions associated with devices that are being monitored by deployment and monitoring 400. Remote sensors or other telemetry devices may be incorporated within the data centers to sense conditions associated with the components installed therein. Remote sensors or other telemetry may also be used to monitor other adverse signals in the data center and feed the information to deployment and monitoring. As an example, if fans that are cooling a rack stop working then that may be sensed by the sensors and reported to the deployment and monitoring functions. This type of monitoring may ensure that any second order effects of the deployment are detected, reported, and corrected.

Still referring to FIG. 4, deployment database 412 may be used to store records related to payload submissions and packages. In addition, deployment database 412 may also store data used for generating reports related to the deployment. Additional details concerning the functions of deployment database 412 are noted in other portions of this disclosure.

Network interfaces 414 may include communication interfaces, such as Ethernet, cellular radio, Bluetooth radio, UWB radio, or other types of wireless or wired communication interfaces. Bus 420 may be coupled to both the control plane and the data plane. Although FIG. 4 shows deployment and monitoring 400 as including a certain number of components arranged and coupled in a certain way, it may include fewer or additional components arranged and coupled differently. In addition, the functionality associated with deployment and monitoring 400 may be distributed, as needed.

Figure 5:
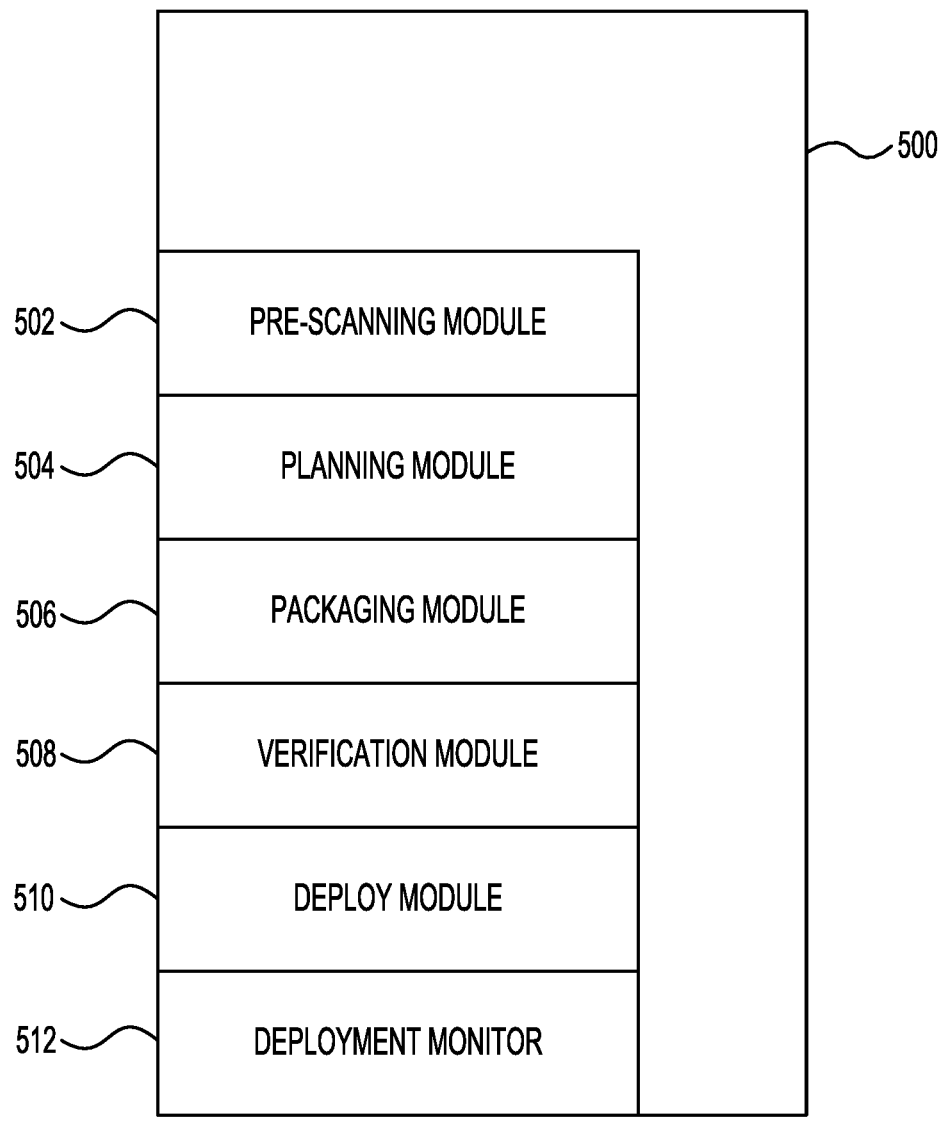
FIG. 5 shows a diagram of a memory 500 comprising modules with instructions for performing operations associated with deployment and monitoring.

FIG. 5 shows a diagram of a memory 500 (e.g., memory 406 of FIG. 4) comprising modules with instructions for performing operations associated with deployment and monitoring 400 (also deployment and monitoring 140 of FIG. 1). Memory 500 may include, pre-scanning module 502, planning module 504, packaging module 506, verification module 508, deploy module 510, and deployment monitor 512. Pre-scanning module 502 may evaluate the payload parameters provided as part of the submission of the payload (e.g., payload submission 102). Pre-scanning module 502 may assess the impact of the deployment of any packages including the payload (e.g., using predefined information from the other tables in database 412 of FIG. 4) and by assessing the current fleet configuration. The results generated by pre-scanning module 502 may be recorded in database 412 of FIG. 4. Planning module 504 may build upon the work performed by pre-scanning module 502 and determine any additional planning information or steps that will be needed and record the results back in database 412. Planning module 504 may determine the risk factors associated with the planned deployment. Planning module 504 may further determine gates and watchdogs that may be needed to ensure safe and reliable deployment. The details related to the gates and the watchdogs may be recorded in database 412. Based on all of this information, planning module 504 may assess the extent of coverage that the various stages used for deployment and verification may provide given the current configuration of the relevant regions of the fleet. Automated deployment may be performed by deploying as part of the validation of the package to a primary stage (e.g., a stage comprising nodes with no workloads), then a secondary stage (e.g., a stage comprising nodes with non-customer workloads), then a minimum scanning tree (as described later), and then a fleet deployment, which may vary in scope based on the package and the payload. A minimum scanning tree of clusters may be automatically generated to reach the target coverage, considering the current fleet usage and composition. Additional details concerning the generation of a minimum scanning tree of clusters is provided with respect to FIGS. 9 and 10. Finally, if the parameters associated with the payload or the package indicate that additional staging is recommended (e.g. one generation before another generation of equipment) then a proposed staging plan may be generated. The generated information may be stored in database 412.

Figure 6:
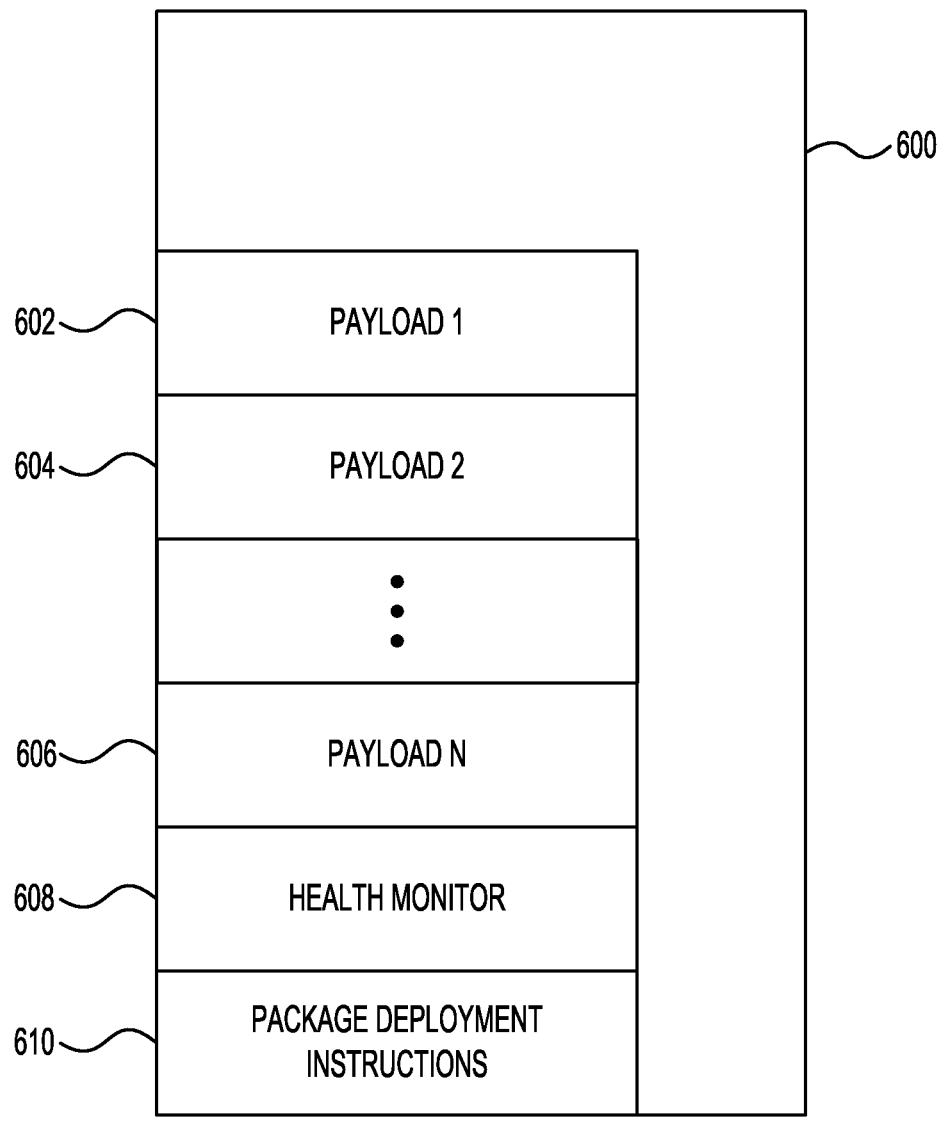
FIG. 6 shows parts of a package in accordance with one example.

Still referring to FIG. 5, packaging module 506 may process the submitted payload and construct a deployment package. As part of this process, packaging module 506 may generate deployment instructions based on the payload parameters. Packaging module 506 may specify a set of Test-In-Production (TIP) devices that may be targeted for deployment before rolling out the deployment further. In one example, the TIP mechanism may be used to perform a minimum coverage of testing to validate the package in key configurations. Additional details of an example package are provided in FIG. 6. Thus, example package 600 may include one or more payloads for deployment. In this example, package 600 may include payload 1 602, payload 2 604, and payload N 606. N may be an integer greater than one. Package 600 may further include a health monitor 608. Health monitor 608 may include information concerning what to monitor and the trigger thresholds associated with the monitored information. Package 600 may further include package deployment instructions 610. In one example, package deployment instructions 610 may include operations or actions prescribing a deployment plan. Package deployment instructions may further include instructions regarding monitoring at a more general level for second order effects.

With reference to FIG. 5, verification module 508 may receive the completed package and validate the package. This process may include initiating a Test-In-Production (TIP) deployment to the targeted devices. Deployment monitor 512 may be implemented as a logical service to monitor the progress of the active deployments. The status of each submission and subsequent deployment may be tracked, including the start time of the deployment, the end time of the deployment, the running time of the deployment, and any delays in the deployment. Deployment monitor 512 may also keep track of performance indicators related to the deployments. Table 1 below shows some of the primary key performance indicators (KPIs) that may be tracked by deployment monitoring 512.

TABLE 1

| Primary KPIs | |
| --- | --- |
| KPI | KPI Description |
| Time-to-Detect (TTD) | This KPI may measure the time it takes to detect issues automatically via monitoring. This may contribute to effective and efficient monitoring. |
| Time-to-Broad-Deployment (TTBD) | This KPI may measure the time it takes from when a package is tested and ready until we initiate broad rollout in the fleet. This KPI measures how long it takes us to get through STAGE 1 (described later) and begin the broader rollout. This KPI contributes to execution efficiency and scale efficiency. |
| Time-to-Complete-Deployment (TTCD) | This KPI may measure the time it takes to complete a deployment. This KPI contributes to execution efficiency and scale efficiency. |
| Deployment Incident Control Management (DICM) | This KPI tracks the overall rate of incidents triggered by the deployment. This KPI contributes to deploying quality packages. |
| High-Impact Deployments (HID) | This KPI reflects the number/percentage of deployments that are categorized as highly impactful to customers (requiring reboot or vacating). This LPI contributes to ensuring minimal impact. |

TABLE 1-continued

Primary KPIs

| KPI | KPI Description |
| --- | --- |
| Monitor Misses (MM) | This KPI measures the number of issues that were found that were not caught by monitoring. This KPI contributes to effective and efficient monitoring. |

Deployment and monitoring 512 may also track additional KPIs, which are referred to as Secondary KPIs in Table 2 below.

TABLE 2

Secondary KPIs

| KPI | KPI Description |
| --- | --- |
| Time-to-Qualify-Deployment (TTQ) | This KPI measures the time it takes to qualify a release and contributes to execution efficiency and deploying quality packages. |
| Time-to-Initiate-Deployment (TTID) | This KPI measures the time from when a determination is made that an update is needed until the time the deployment initiated. The goal of this KPI is to understand the time to prepare a deployment. This KPI contributes to overall execution efficiency. |
| Cluster Deployment Readiness (CDR) | This KPI measures the readiness of a cluster prior to deployment by performing pre-requisite checks. The intention is to use this as a gate if a cluster is ready for deployment (% of nodes not ready, firmware version variance, MOS version variance, remediation package readiness, queued deployments, etc.). This KPI contributes to execution efficiency. |
| Hygiene KPI (HYG) | This KPI indicates the current freshness of the fleet. This KPI contributes to scaling efficiency and ensuring minimal impact. |
| Time-to-HotFix (TTHF) | This KPI measures the time from when a critical bug is discovered until the hotfix deployment is initiated. This KPI contributes to execution efficiency. |
| Automation Efficiency (AE) | This KPI measures the amount of the process that is automated (vs. requiring manual processing). This KPI contributes to execution efficiency and scaling efficiency. |

Figure 7:
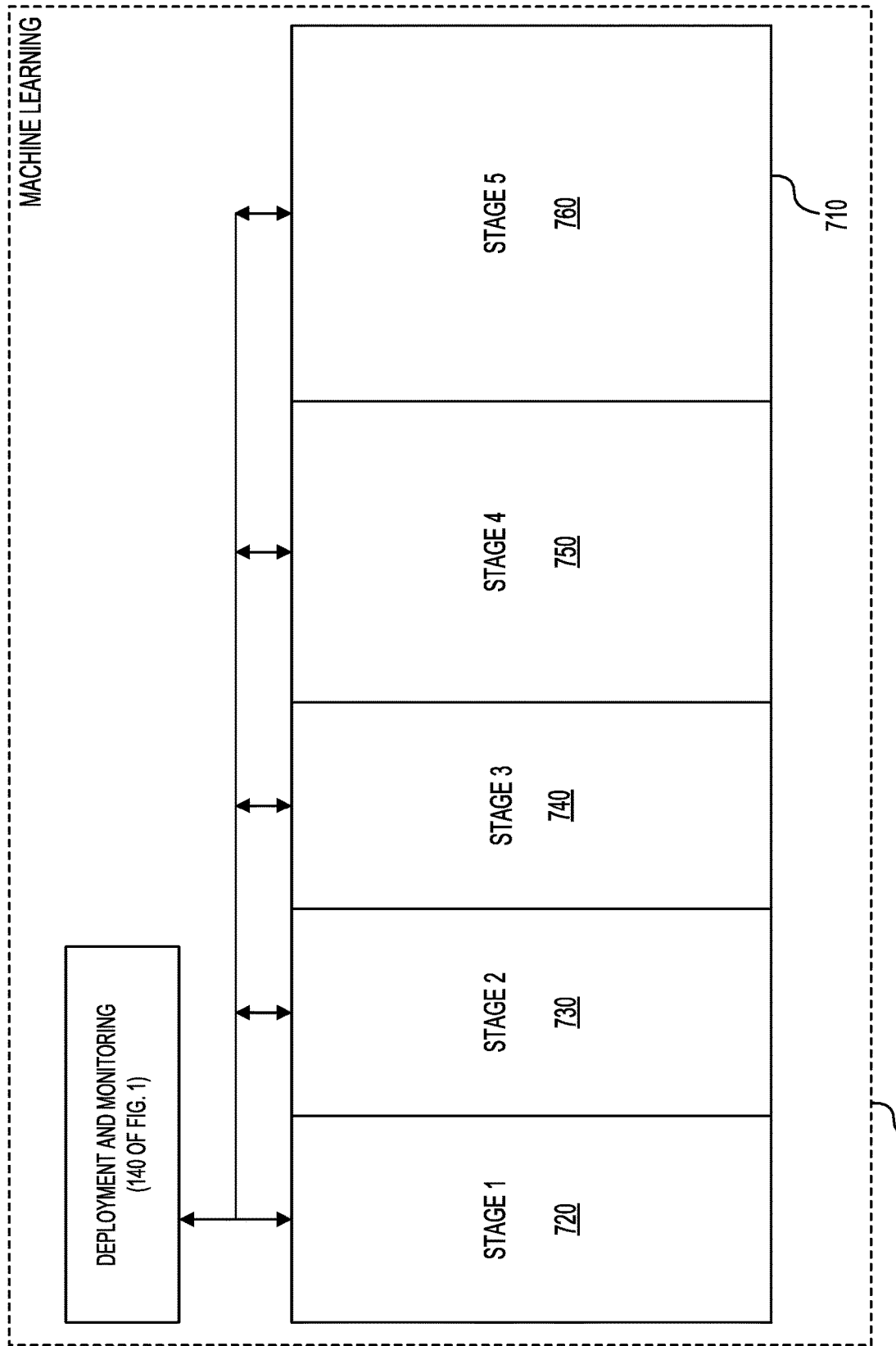
FIG. 7 shows an example of a staging deployment in accordance with one example.

FIG. 7 shows an example of a staged deployment 700 in accordance with one example. A package deployment may impact hundreds of unique components, each of which may have a corresponding SKU or a unique identifier to identify the type of component that distinguishes the component from other component types. An example component may be a specific CPU version produced by Intel. In this example, the deployment of firmware to Intel CPUs may impact dozens of unique CPU versions produced by Intel that may be deployed as part of the fleet receiving the firmware update. A particular CPU version may have a corresponding SKU to identify this version of the CPU. The fleet may include thousands of the CPUs having this particular version of the CPU. The fleet may include many other versions of the Intel CPUs and thousands (or fewer) of CPUs of each of these other versions. In this example, deployment may be safely accomplished by following a safe deployment process. An example safe deployment process may include first scanning the fleet to determine the diversity of SKUs in the fleet. This process may include deployment and monitoring 140 continuously scanning the fleet and keeping track of each unique triplet, or a 3-tuple, including the generation associated with the hardware, the manufacturer associated with the hardware, and the SKU associated with the device. Deployment database 412 of FIG. 4 may include tables to keep track of the unique triplets.

With continued reference to FIG. 7, in one example, the deployment testing set up (e.g., fleet portion 710) may be organized in stages that may conceptually correspond to a blast radius. Thus, each stage may include an increasing diversity of hardware, such that a package deployment to an increasing number of stages may cover an increasing diversity of the hardware in the fleet. Thus, STAGE 1 720 may include hardware (e.g., servers) that are configured to handle only synthetic workloads. As an example, the servers organized as part of STAGE 1 720 may host virtual machines that are not servicing any customer workloads or other workloads that may adversely affect a customer or another user. In this example, using the blast radius analogy, the blast radius may be zero since any package deployment to STAGE 1 720 will not impact any real workloads. STAGE 2 730 may include hardware (e.g., servers) that are configured to handle live workloads that if impacted may adversely affect at least some users' workloads, but not any customers' workloads. Thus, in this example, using the blast radius analogy, STAGE 2 730 may include at least some number of servers that if impacted by the package deployment may affect at least a small number of users' workloads. One way to estimate the effect on the customers' workloads is to classify the servers based on container counts or virtual machine (VM) counts. Thus, in one example, as part of STAGE 2 730 only those servers may be targeted for deployment whose container count or VM count is below a threshold (e.g., two containers per server or two VMs per server). STAGE 3 740 may include a larger number of servers that if impacted may adversely affect at least a small number of customers' workloads. In one example, STATE 3 740 may also include servers that have a larger container count per server or a larger VM count per server. STAGE 4 750 and STAGE 5 760 may include an increasing number, and diversity, of servers that if impacted may adversely affect an increasingly larger number of customers' workloads. Once again, in one example, the increasingly larger number of customers' workloads may correspond to an increasingly larger number of container count per server or VM count per server. Of course, other indicia of customers' workload may also be used to determine which severs or other hardware is included in one stage or the other. In one example, by first deploying the package to as few stages as possible, the blast radius of the deployment may be managed. Although FIG. 7 shows a certain number of stages for safe deployment, additional or fewer stages may be used.

Figure 8:
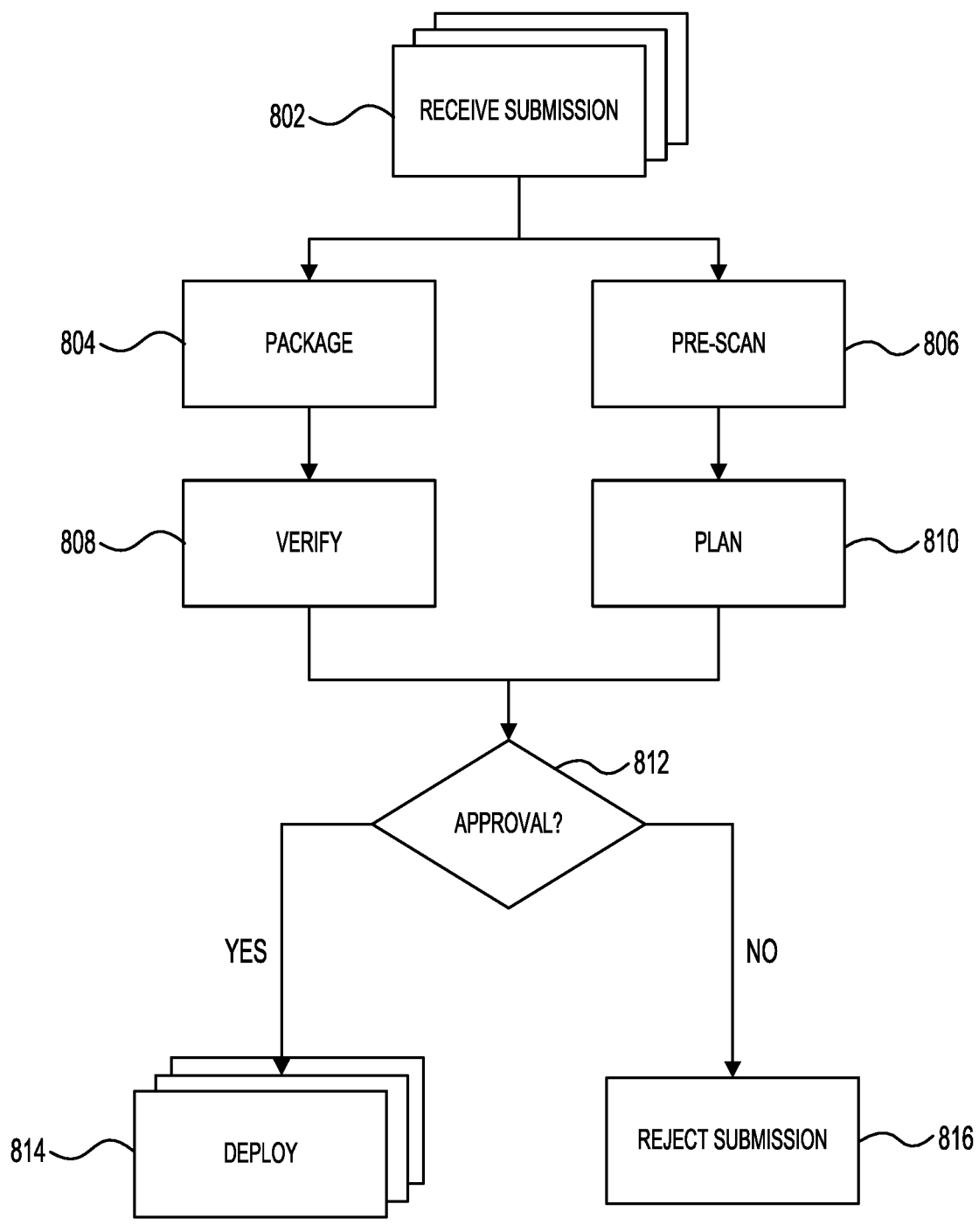
FIG. 8 shows a flow chart of a method for deploying packages in accordance with one example.

FIG. 8 shows a flow chart 800 of a method for deploying packages in accordance with one example. Step 802 may include receiving a submission. After the receipt of the submission, some of the next processing steps may be performed in parallel. Thus, in this example, one path may involve creating the package and verifying the package and the parallel path may involve pre-scanning and planning the deployment. As part of the packaging path, the package may be automatically created and verified. Thus, step 804 may include creating the package that may include the payload(s), package deployment instructions (e.g., configuration instructions or settings), and a health monitor (e.g., package 600 of FIG. 6). In this example, this step may be performed when instructions corresponding to packaging module 506 of FIG. 5 are executed by processor 402 of FIG. 4. This package may further include a set of test-in-production (TIP) targets identified for the verification of the package. Step 808 may include verifying the package. In this example, this step may be performed when instructions corresponding to verification module 502 of FIG. 5 are executed by processor 402 of FIG. 4. The package verification may include automatically processing the package as part of the TIP. Any results obtained through these steps may be stored in deployment database 412 of FIG. 4.

With continued reference to FIG. 8, the planning path may involve automatically determining the risk factors and any gates that may be needed. Thus, in this example, step 806 may include pre-scanning the payload and any other submission parameters to determine the risk factors associated with the deployment of any package including the submitted payload(s). The risk factors and the gates may be tracked in deployment database 412 of FIG. 4. In this example, this step may be performed when instructions corresponding to pre-scanning module 502 of FIG. 5 are executed by processor 402 of FIG. 4. Based on the parameters, an assessment may be made of the coverage that a smaller number of servers, or other type of equipment, organized in STAGE 1 720 of FIG. 7 and/or STAGE 2 730 of FIG. 7 will provide given the current configuration of the fleet. As part of this step, deployment and monitoring (e.g., deployment and monitoring 140 of FIG. 1) may provide a proposed deployment plan (step 810). The deployment plan may include the degree of parallelism that could be achieved during the packaging and deployment. An example level of parallelism during the deployment may relate to whether all of the servers in a rack that are part of a single cluster can receive the package in parallel or not. The deployment plan may further include the level of testing and validation required prior to deploying a package to the fleet. The deployment plan may also factor in the criticality of the customers and their workloads. Thus, certain customers may have devices that are critical to their operations and any deployment of the packages to those devices may require additional sign-offs. Specifics associated with the deployment plan may be stored in deployment database 412 of FIG. 4 or another storage. In this example, this step may be performed when instructions corresponding to planning module 504 of FIG. 5 are executed by processor 402 of FIG. 4. The deployment plan may be approved or disapproved in step 812. In one example, this decision may be made by an administrator associated with the fleet.

Still referring to FIG. 8, if in step 812 the deployment plan is approved, then in step 814, the package(s) may be deployed. In this example, this step may be performed when instructions corresponding to deploy module 510 of FIG. 5 are executed by processor 402 of FIG. 4. Additional details regarding deployment that uses a minimum scanning tree approach are provided with respect to FIGS. 9 and 10. Alternatively, if in step 812, the deployment is disapproved, then, in step 816, the submission may be rejected. As part of this step, deployment and monitoring may record the rejection of the submission. Although FIG. 8 shows certain number of steps being performed in a certain order, additional or fewer steps may be performed in the same order or a different order.

FIG. 9 shows a diagram of scanning trees 900 for the hardware in STAGE 1 720 of FIG. 7 in accordance with one example. As described earlier, STAGE 1 720 may include hardware (e.g., servers) that are configured to handle only synthetic workloads. As an example, the servers organized as part of STAGE 1 720 may host virtual machines that are not handling any customers' workloads or other workloads that may adversely affect a customer or another user. In this example, FIG. 9 shows that there are two generations (G1 910 and G2 940) of hardware in STAGE 1 720. Each device with a unique SKU (or some other item identifier) that may be the target of the deployment of a payload (e.g., firmware) may be represented as edges of a scanning tree. In this example, each device may be identified by a triplet (3-tuple) including: (1) the generation of the hardware in a data center where the device is located, (2) the manufacturer of the server or other equipment that has the device, and (3) a SKU associated with the device. Thus, in this example, STAGE 1 720 may include the following triplets: G1 910, M1 912, SKU 1 922; G1 910, M1 912, SKU 2 924; G1 910, M2 914, SKU 3 926; G1 910 MM 916, SKU 7 928; and G1 910, MM 916, SKU 9 930. STAGE 1 720 may further include the following triplets: G2 940, M1 942, SKU 1 952; G2 940, M1 942, SKU 2 954; G2 940, M3 944, SKU 5 956; and G2 940, MM 946, SKU 8 958. The information concerning the triplets in scanning trees 900 corresponding to STAGE 1 720 may be stored in a database (e.g., deployment database 412 of FIG. 4). Although FIG. 9 shows scanning trees with only two generations of hardware, there may be additional scanning trees with other generations of hardware. Similarly, although FIG. 9 shows a certain number of manufacturers and certain number of SKUs, there could be additional manufacturers and SKUs.

Figure 10:
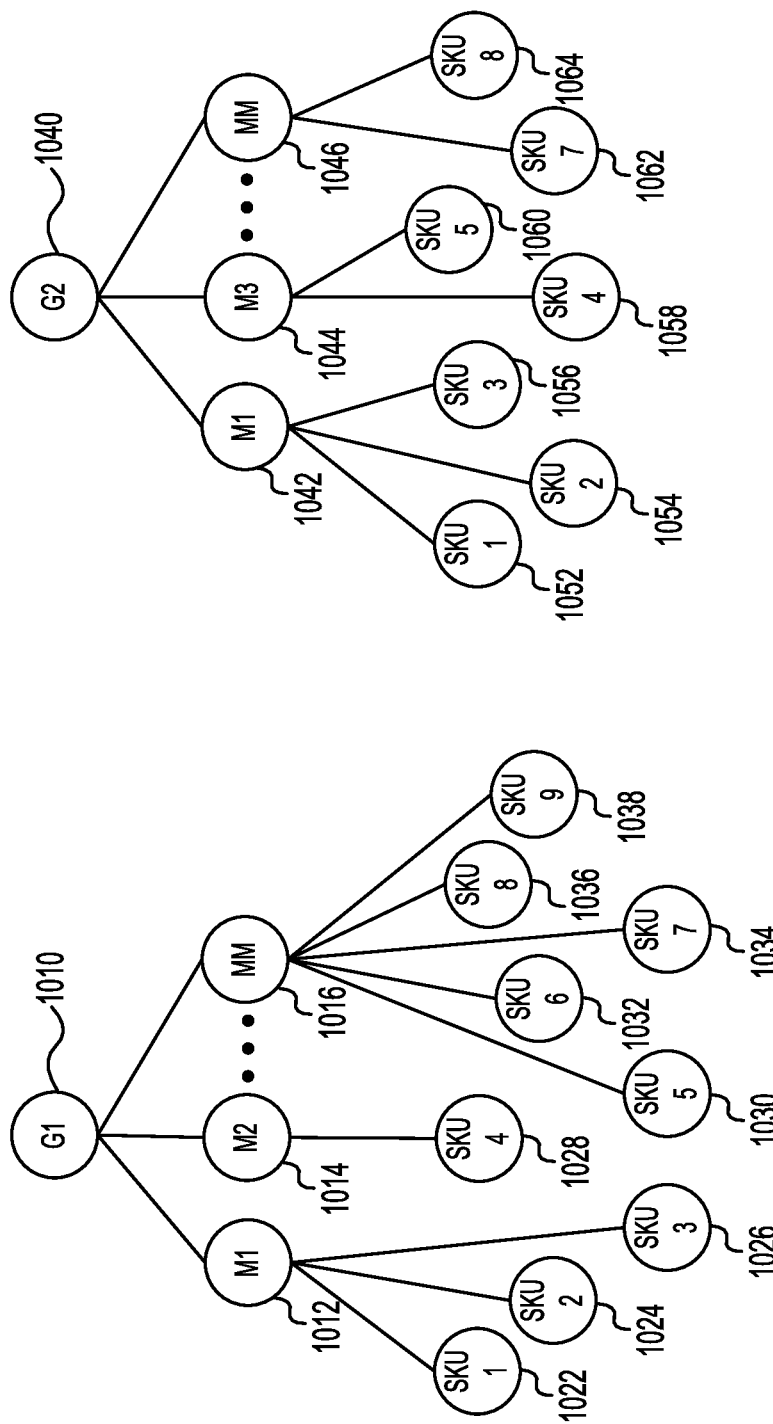
FIG. 10 shows a diagram of scanning trees for the hardware in another stage in accordance with one example.

FIG. 10 shows a diagram of scanning trees 1000 of the hardware in STAGE 2 730 of FIG. 7 in accordance with one example. As described earlier, STAGE 2 730 may include at least some number of servers that if impacted by the package deployment may affect at least a small number of users' active workloads. In this example, FIG. 10 shows that there are two generations (G1 1010 and G2 1040) of hardware in STAGE 2 730. Each device with a unique SKU (or some other identifier) that may be the target of the deployment of a payload (e.g., firmware) may be represented as edges of a scanning tree. In this example, like the example described with respect to FIG. 9, each device may be identified by a triplet (3-tuple) including: (1) the generation of the hardware in a data center where the device is located, (2) the manufacturer of the server or other equipment that has the device, and (3) a SKU associated with the device. Thus, in this example, STAGE 2 730 may include the following triplets: G1 1010, M1 1012, SKU 1 1022; G1 1010, M1 1012, SKU 2 1024; G1 1010, M1 1012, SKU 3 1026; G1 1010, M2 1014, SKU 4 1028; G1 1010 MM 1016, SKU 5 1030; G1 1010, MM 1016, SKU 6 1032; G1 1010, MM 1016, SKU 7 1034; G1 1010, MM 1016, SKU 8 1036; and G1 1010, MM 1016, SKU 9 1038. STAGE 2 730 may further include the following triplets: G2 1040, M1 1042, SKU 1 1052; G2 1040, M1 1042, SKU 2 1054; G2 1040, M1 1042, SKU 3 1056; G2 1040, M3 1044, SKU 4 1058; G2 1040, M3 1044, SKU 5 1060; G2 1040, MM 1046, SKU 7 1062; and G2 1040, MM 1046, SKU 8 1064. In this example, the scanning tree for STAGE 2 730 includes a higher diversity of components. As an example, the scanning tree for STAGE 2 730 includes SKU 3 1026 as part of generation G1 hardware provided by manufacturer M1. In addition, the scanning tree for STAGE 2 730 includes additional types of components from generation G1 that are provided by manufacturer MM. Similarly, with respect to generation G2 hardware, the scanning tree includes additional types of components. The information concerning the triplets in scanning trees 1000 corresponding to STAGE 2 730 may be stored in a database (e.g., deployment database 412 of FIG. 4). Although FIG. 10 shows scanning trees with only two generations of hardware, there may be additional scanning trees with other generations of hardware. Similarly, although FIG. 10 shows a certain number of manufacturers and certain number of SKUs, there could be additional manufacturers and SKUs.

Figure 11A:
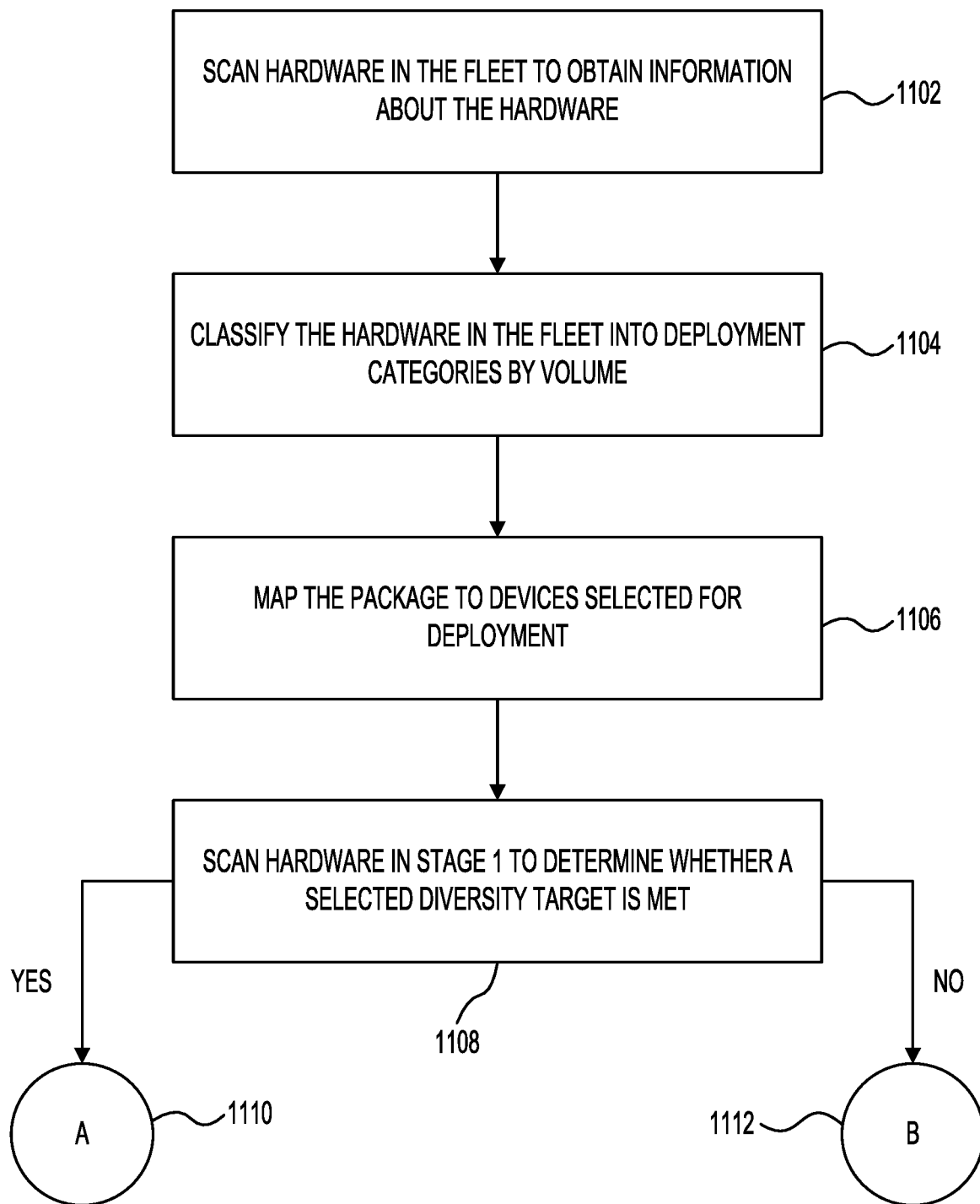
FIGS. 11A and 11B show a flowchart of a method for deploying packages in accordance with one example.
Figure 11B:
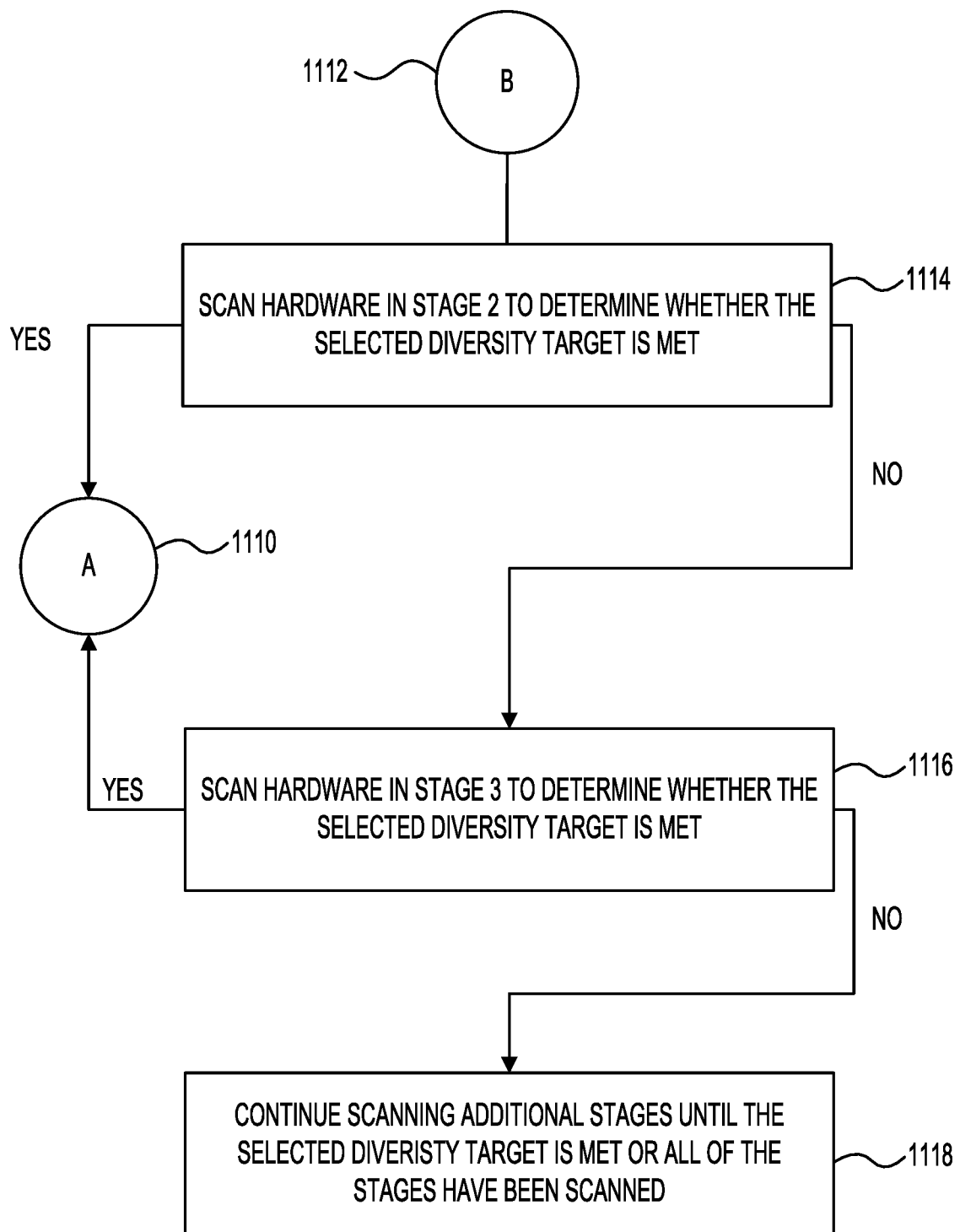

FIGS. 11A and 11B show a flowchart of a method for deploying packages in accordance with one example. Step 1102 may include scanning the hardware in the fleet to obtain information about the hardware. In one example, step 1102 may include pre-scanning module 502 of FIG. 5 scanning the hardware in the fleet to obtain information concerning the hardware components deployed in the fleet. The information obtained by scanning the hardware may be stored in deployment database 412 of FIG. 4. The scanned information may include information concerning the generation, the manufacturer, and the SKU associated with each of the hardware components in the fleet. This information may be organized in one or more tables and stored in deployment database 412 of FIG. 4.

Step 1104 may include classifying the hardware in the fleet into deployment categories by volume. In one example, classifying the hardware in the fleet into deployment categories by volume may include planning module 504 of FIG. 5 processing the scanned information concerning the hardware. Deployment categories may include at least one type (or category) of components that may require the deployment of a package. Thus, in one example, each deployment category may include those components that can receive the same, or a similar, payload. The classification information may be stored in deployment database 412 of FIG. 4. Planning module 504 may also determine the risk factors associated with the planned deployment. As an example, planning module 504 may determine the type of customers' that may be impacted by the deployment. Planning module 504 may further determine gates and watchdogs that may be needed to ensure safe and reliable deployment. The details related to the gates and the watchdogs may also be recorded in deployment database 412 of FIG. 4. Based on all of this information, planning module 504 may assess the extent of coverage that the various stages used for deployment and verification may provide given the current configuration of the relevant regions of the fleet.

Step 1106 may include mapping the package to devices selected for deployment. As part of this step, planning module 504 may create information (e.g., a table or a set of tables) mapping the package to the devices selected for deployment of the package. This information may be stored in deployment database 412 of FIG. 4.

Step 1108 may include scanning the hardware in STAGE 1 to determine whether a selected diversity target is met. If the selected diversity target is met, then the flow may proceed to processing stage A 1110. Otherwise, the flow may proceed to processing stage B 1112. In one example, as part of this step, planning module 504 may construct (or process existing) minimum scanning trees as described with respect to FIGS. 9 and 10. The goal may be to obtain a reasonable amount of confidence in deploying the package in a manner that is consistent with an operational characteristic, such as minimum disruption to customers' workloads. As an example, if the package is to be deployed to FPGAs having five different SKUs in the fleet, then the minimum scanning tree may include a selected set of triplets, as described with respect to FIG. 9, in STAGE 1 that allow coverage of the selected diversity target. The selected diversity target may be a percentage of the different type of SKUs that may receive the package as part of the planning stage of the deployment. Thus, in this example, as long as 80 percent of the different types of FPGAs receive the package then that may be sufficient to meet the selected diversity target. Assuming, as part of this example, STAGE 1 includes only 50 percent of the different types of FPGAs, then planning module 504 may conclude that the selected diversity target is not met and the processing may continue to processing stage B 1112. Alternatively, if STAGE 1 includes 80 percent of the different types of FPGAs, then planning module 504 may proceed to processing stage A 1110.

With respect to FIG. 11B, if scanning hardware in STAGE 1 does not result in the selected diversity target being met, the flow may continue from processing stage B 1112. Thus, step 1114 may include scanning the hardware in STAGE 2 to determine whether the selected diversity target is met. In this example, planning module 504 may construct (or process existing) minimum scanning trees as described with respect to FIG. 10. Similar to the example of the FPGAs with respect to FIG. 11A, planning module 504 may scan the hardware in STAGE 2 to determine whether the selected diversity target is met. Thus, if a combination of the SKUs for the FPGAs in STAGE 1 and STAGE 2 includes 80 percent of the SKUs for the FPGAs, then planning module 504 may proceed to processing stage A 1110. Otherwise, the flow may proceed to step 1116.

Step 1116 may include scanning hardware in STAGE 3 to determine whether selected diversity target is met. In this example, planning module 504 may construct (or process existing) minimum scanning trees for STAGE 3 in a similar manner as described with respect to FIG. 10. Similar to the example of the FPGAs with respect to FIG. 11A, planning module 504 may scan the hardware in STAGE 3 to determine whether the selected diversity target is met. Thus, if a combination of the SKUs for the FPGAs in STAGE 1, STAGE 2, and STAGE 3 includes 80 percent of the SKUs for the FPGAs, then planning module 504 may proceed to processing stage A 1110. Otherwise, the flow may proceed to step 1118.

Step 1118 may include continuing scanning additional stages until the selected diversity target is met or all of the remaining stages have been scanned. In one example, the selected diversity target may be chosen based on the package type. Alternatively, or additionally, the selected diversity target may be chosen based on the impact type. Thus, for a certain package type, the selected diversity target may be 75% of the SKUs, whereas for another package type the selected diversity target may be 90%.

Once the state of the fleet has been determined and a minimum scanning tree has been determined for the deployment of a particular package or a group of packages, the processing may proceed to the next steps. These steps may include determining the velocity of the deployment. In one example, the velocity of the deployment may be related to the number of gates the deployment includes. Each gate may correspond to a wait time period (e.g., a certain number of hours, days, or months) specifying the time for which the deployment may be delayed after each step of the deployment process. As an example, for the deployment of a particular package to the CPUs, the deployment may be gated for 24 hours after deployment to the minimum scanning tree; after the elapse of the 24 hours, the package may be deployed to CPUs with the relevant SKUs in the rest of the fleet. In one example, the gates may specify a longer wait time period when the deployment relates to the devices that are processed via the control plane (e.g., control plane 230 of FIG. 2) relative to the devices that are processed via the data plane (e.g., data plane 220 of FIG. 2).

In another example, the velocity of the deployment may be related to the impact of the deployment. Thus, the number of gates and the wait time period specified by the gates may depend upon the impact of the deployment on the fleet. As an example, certain deployments may be characterized as impactful and other deployments may be characterized as impact-less. Deployments may also be characterized along a sliding scale between the impact-less and impactful. This process may include, planning module 504 considering both the package type and the impact type of the package. The information corresponding to impact, including the impact type and the package type, may be stored in a table in a database (e.g., deployment database 412 of FIG. 4).

FIG. 12 shows an impact table 1200 in accordance with one example. Impact table 1200 may be used to keep track of the impact of package deployment on the various devices in the fleet. As an example, impact table 1200 may be used to categorize the impact on the devices into impact type and the packages into package types. In one example, impact table 1200 may be stored in deployment database 412 of FIG. 4. In this example, impact table 1200 may include information organized in rows and columns, including impact type 1210 in rows and package type 1240 in columns. Impact type 1210 may include CPU pause 1212, storage pause 1214, network pause 1216, FPGA pause 1218, reboot 1220, increased power 1222, decreased performance 1224, and thermal impact 1226. Package type 1240 may include microcode 1242, Universal Extensible Firmware Interface (UEFI)/Basic Input/Output System (BIOS) 1244, Baseboard Management Controller (BMC) 1246, Solid-State Drive (SSD) 1248, Hard Disk Drive (HDD) 1250, and FPGA 1252. FPGA 1252 may further include two package sub-types: FPGA platform 1254 and FPGA image 1256. Although impact table 1200 shows certain information organized in a certain manner, additional or fewer information may be included and organized in a different manner. In addition, information in impact table 1200 may be encapsulated in other types of data structures, included linked lists or other structures. As another example, the information in the impact table may be distributed such that impact information for each package may be included along with the package as metadata or other data structures associated with the package.

With continued reference to FIG. 12, in this example, as shown in the table, the deployment of a package with microcode may cause a CPU pause of less than X seconds (Xs); the deployment of a package with UEFI/BIOS may cause a CPU pause of less than X seconds (Xs); and the deployment of a package to an FPGA platform may cause a CPU pause of less than X seconds (Xs), where X is a number. Further, in this example, the deployment of a package to an SSD may cause a storage pause of Y seconds (Ys) and the deployment of a package to an HDD may cause a storage pause of Z seconds (Zs), where each of Y and Z is a number. In addition, a deployment of a package to the FGPA platform may cause a network pause of less than F seconds (Fs). A deployment of a package to the FPGA platform may cause an FPGA pause of less than P seconds (Ps). On the other hand, a deployment of a package to the FPGA image may be image-specific.

Still referring to FIG. 12, in this example, impact table 1200 may include information concerning the packet types that may cause a reboot. Thus, in this example, deployment of a UEFI/BIOS package and a deployment of a package to FPGA platform may always cause a reboot; however, the deployment of a package to an SSD or an HDD may cause a reboot only some of the times. Impact table 1200 may further include information concerning a change in power consumption (e.g., increased power) based on the deployment of certain package types. For microcode, UEFI/BIOS, SSD, and HDD package types the increase in power may be low; however, the increase in power may be medium for the FPGA platform package type and for the FPGA image the increase in power may be image-specific. Impact table 1200 may further include information concerning a change in performance (e.g., decreased performance) based on the deployment of certain package types. For microcode, UEFI/BIOS, SSD, and HDD package types the decrease in performance may be low. Impact table 1200 may further include information concerning a change in thermal impact (e.g., higher or lower thermal impact) based on the deployment of certain package types. For microcode, UEFI/BIOS, and BMC package types the thermal impact may be low.

Although impact table 1200 contains information concerning certain package types and impact types, impact table 1200 may contain information concerning additional or fewer of each of package types and impact types. As an example, impact table 1200 may include information concerning impact on the deployment of packages to Network Interface Controllers (NICs), Top-of-Rack (TOR) switches, Middle-of-Rack (MOR) switches, routers, power distribution units (PDUs), and rack level uninterrupted power supply (UPS) systems.

Figure 13:
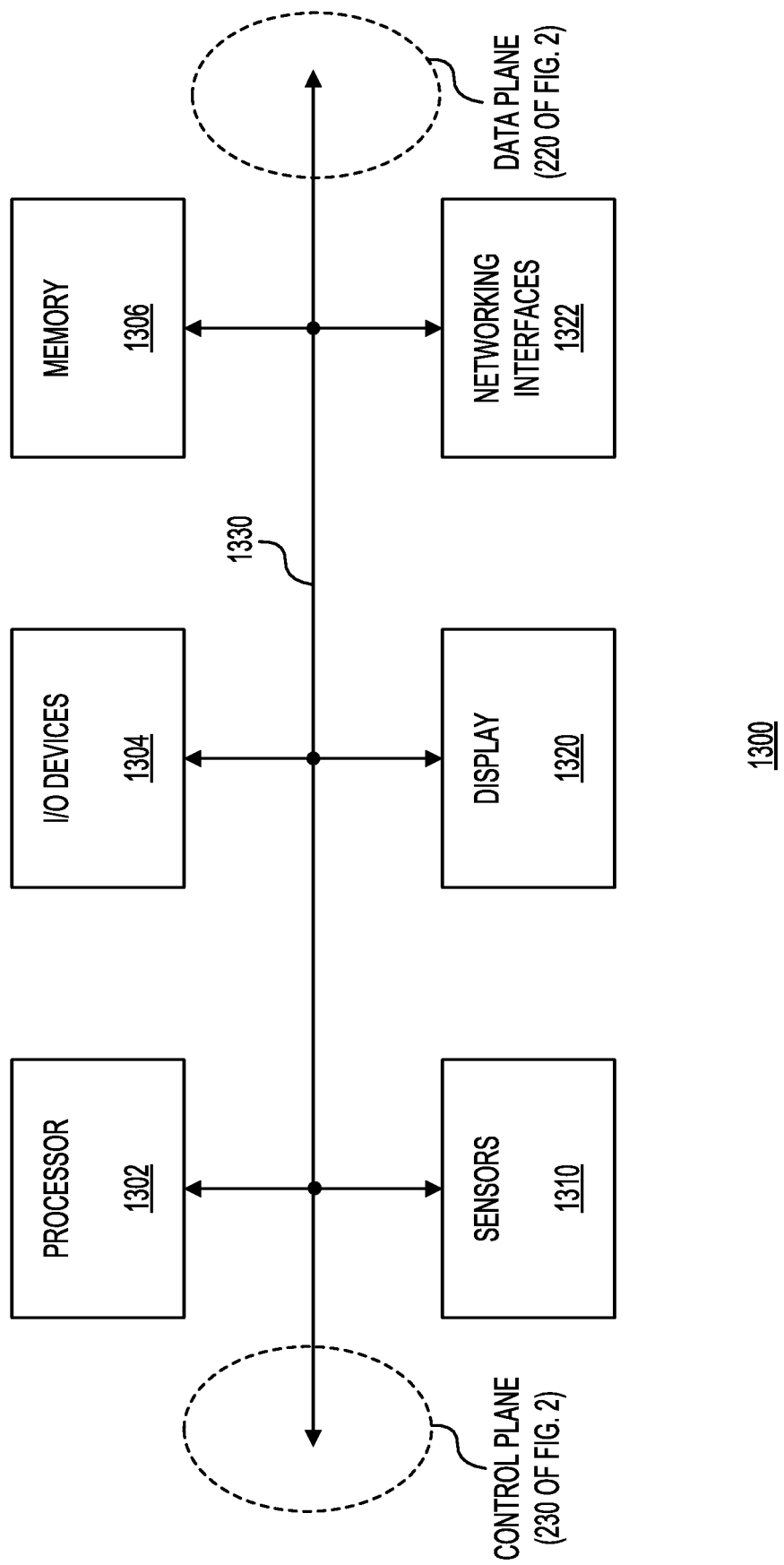
FIG. 13 shows a machine learning system in accordance with one example.

FIG. 13 shows a machine learning system 1300 in accordance with one example. Machine learning system 1300 may include a processor 1302, I/O devices 1304, a memory 1306, sensors 1310, a display 1320, and networking interfaces 1322, which may be interconnected via a bus system 1330. Bus system 1330 may be coupled to both the data plane (e.g., data plane 220 of FIG. 2) and the control plane (e.g., control plane 230 of FIG. 2) via networks, including wired and wireless networks. Processor 1302 may execute instructions stored in memory 1306. Memory 1306 may be any combination of non-volatile storage or volatile storage (e.g., flash memory, DRAM, SRAM, or other types of memories). Sensors 1310 may include telemetry or other types of sensors configured to detect, and or receive, information (e.g., conditions associated with the devices).

With continued reference to FIG. 13, sensors 1310 may include sensors configured to sense conditions associated with CPUs, memory or other storage components, FPGAs, motherboards, baseboard management controllers, or the like. Sensors 1310 may also include sensors configured to sense conditions associated with racks, chassis, fans, power supply units (PSUs), or the like. Sensors 1310 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like. Sensors 1310 may be implemented using a sensor API that may allow sensors 1310 to receive information via the sensor API. Software configured to detect or listen to certain conditions or events may communicate via the sensor API any conditions associated with devices that are being monitored by deployment and monitoring 400. Remote sensors or other telemetry devices incorporated within the data centers to sense conditions associated with the components installed therein may sense conditions and provide the information to sensors 1310 or processor 1302. In addition, deployment and monitoring may also communicate data related to events or conditions to sensors 1310 or processor 1302. As an example, any events or conditions sensed by sensors 410 of FIG. 4 may be provided to processor 1302, as needed.

Display 1320 may be any type of display, such as LCD, LED, or other types of display. Network interfaces 1322 may include communication interfaces, such as Ethernet, cellular radio, Bluetooth radio, UWB radio, or other types of wireless or wired communication interfaces. Although FIG. 13 shows machine learning system 1300 as including a certain number of components arranged and coupled in a certain way, it may include fewer or additional components arranged and coupled differently. In addition, the functionality associated with machine learning system 1300 may be distributed, as needed.

Figure 14:
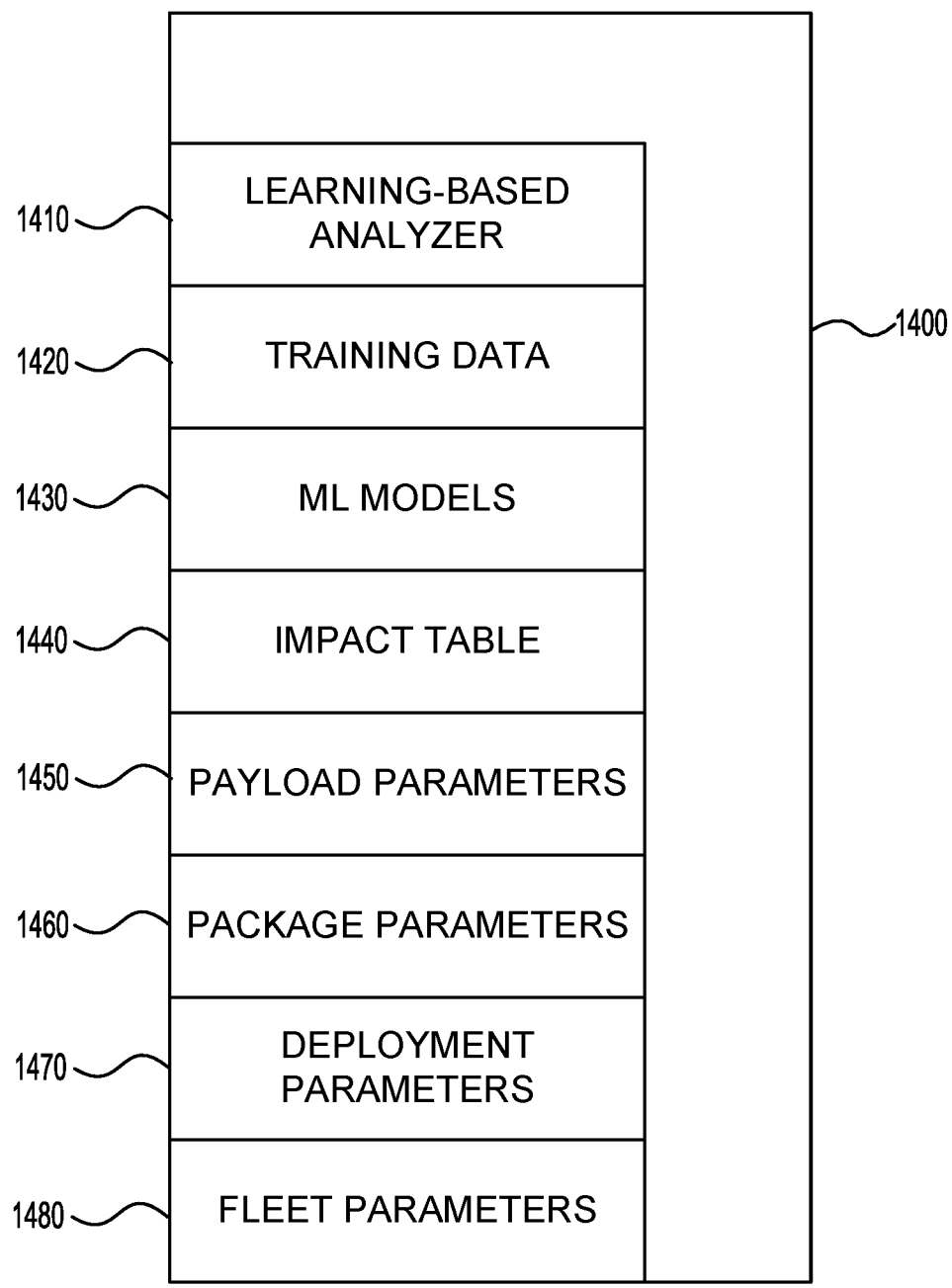
FIG. 14 shows a memory including instructions and data for use with the machine learning system of FIG. 13 in accordance with one example.

FIG. 14 shows a memory 1400 (e.g., memory 1306 of FIG. 13) including instructions and data for use with machine learning system 1300 in accordance with one example. In this example, the instructions may be organized in memory 1400 in the form of blocks or modules including code, data, or both. In this example, memory 1400 may include a learning-based analyzer (LBA) 1410, training data 1420, machine learning (ML) models 1430, impact table 1440, payload parameters 1450, package parameters 1460, deployment parameters 1470, and fleet parameters 1480. Although FIG. 14 shows instructions and data organized in a certain way, the instructions and data may be combined or distributed in various ways.

With continued reference to FIG. 14, learning-based analyzer (LBA) 1410 may implement a supervised learning algorithm that can be trained based on input data and once it is trained it can make predictions or prescriptions based on the training. In this example, LBA 1410 may implement techniques such as Linear Regression, Support Vector Machine (SVM) set up for regression, Random Forest set up for regression, Gradient-boosting trees set up for regression and neural networks. Linear regression may include modeling the past relationship between independent variables and dependent output variables. Neural networks may include artificial neurons used to create an input layer, one or more hidden layers, and an output layer. Each layer may be encoded as matrices or vectors of weights expressed in the form of coefficients or constants that might have been obtained via off-line training of the neural network. Neural networks may be implemented as Recurrent Neural Networks (RNNs), Long Short Term Memory (LSTM) neural networks, or Gated Recurrent Unit (GRUs). All of the information required by a supervised learning-based model may be translated into vector representations corresponding to any of these techniques. Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In the case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tanh(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tanh(c_t)$$

In this example, inside each LSTM layer, the inputs and hidden states may be processed using a combination of vector operations (e.g., dot-product, inner product, or vector addition) or non-linear operations, if needed.

Although FIG. 14 describes LBA 1410 as comprising instructions, the instructions could be encoded as hardware corresponding to an A/I processor. In this case, some or all of the functionality associated with the learning-based analyzer may be hard-coded or otherwise provided as part of an A/I processor. As an example, A/I processor may be implemented using an FPGA with the requisite functionality.

Training data 1420 may be data that may be used to train a neural network model or a similar machine learning model. In one example, training data 1420 may be used to train the machine learning model to minimize an error function associated with the deployment of a package. In one example, the minimization of the error function may be obtained by obtaining user feedback on the various payload and package parameters and to determine appropriate weights for convolution operations or other types of operations to be performed as part of machine-based learning. As an example, the users in a test environment may be provided with a set of preselected mapping functions with known payload and package parameters and asked to select the mapping function that they prefer.

ML models 1430 may include machine language models that may be used as part of machine learning system 1300. ML models 1430 may include models that are created by the training process. In this example, training data 1420 may include target attributes, such as a selected diversity target for deploying a package. An appropriate machine learning algorithm included as part of LBA 1410 may find patterns in training data 1420 that map a given set of input parameters (e.g., payload parameters and package parameters) to a selected diversity target for deploying the package. In another example, the machine learning algorithm may find patterns in training data 1420 that map the input parameters to a deployment classification. An example deployment classification may include at least two categories: impactful or impact-less. Other machine language models may also be used. As an example, training data 1420 may be used to train a machine language model that maps the input package type to any impact associated with the deployment of the package. The impact may be represented in a similar form as described with respect to impact table 1440. Thus, impact table 1440 may be similar or identical to impact table 1200 of FIG. 12.

Payload parameters 1450 may include parameters associated with a payload. In one example, payload parameters may include the type of the payload, the target SKUs for the payload, the degree of change caused by the deployment of the payload, any prerequisites, any known impact, and required deployment time. Payload parameters 1450 may be extracted from the metadata associated with the payload or otherwise obtained through the submission process as described earlier.

Package parameters 1460 may include parameters associated with a package that includes the payload. In one example, package parameters 1460 may include information concerning the type of health monitoring that is included with the package. Package parameters 1460 may further include the package type and the gates and watchdogs required for the deployment of the package.

Deployment parameters 1470 may include information concerning the rollout plan. As an example, deployment parameters 1470 may include an assessment of the target conditions that will be required for the deployment. These conditions may include information regarding whether any of a device reset, node reboot, node repave, power supply cycle, or disk reformat is required. These parameters may be included as part of the instructions and/or metadata associated with a package.

Fleet parameters 1480 may include information concerning the entire fleet or a subset of the fleet that may be the target of deployment. Fleet parameters may include information related to the item types (e.g., the SKUs) associated with the data centers in the fleet or the subset of the fleet. This information may include the number of each of the SKUs. In addition, fleet parameters 1480 may include additional details on the data centers included in the fleet or the subset of the fleet. As an example, the information concerning data centers may include the location information, the AC voltage supply in the data center (e.g., 120 Volts or 240 Volts), the operator information (e.g., whether the data center is operated by the service provider or by the customer of the service provider). Fleet parameters 1480 may be assessed using deploy module 510 of FIG. 5. Some of fleet parameters 1480 may be stored in deployment database 412 of FIG. 4.

ML models 1430 may include models that are trained to prioritize targets with minimal impact. Thus, in one example, an ML model may learn that when a node reboot is required then the deployment should first be made to nodes that are empty—in that they are not running any workloads. ML models 1430 may also include models that can be trained to receive as input the parameters associated with the payload, the package, the deployment, and the fleet, and determine whether some of the deployment steps could be performed in parallel. In addition, ML models 1430 may include models that can be trained to receive as input the parameters associated with the payload, the package, the deployment, and the fleet, and determine the specific gates and watchdogs that may be needed during the deployment to the fleet. Moreover, ML models 1430 may include models that can be trained to receive as input the parameters associated with the payload, the package, the deployment, and the fleet, and determine the type of health monitoring that should be included as part of the deployment of the package. Finally, other automated feedback models may also be used. As an example, such automated feedback models may not rely upon machine learning; instead, they may rely on other feedback mechanisms to allow for the automatic creation of the packages for deployment or to allow for the automatic creation of a deployment plan for deploying a package to the fleet. Regardless, in some cases, automated feedback models may use machine language models for learning, such as reinforcement learning models.

Figure 15:
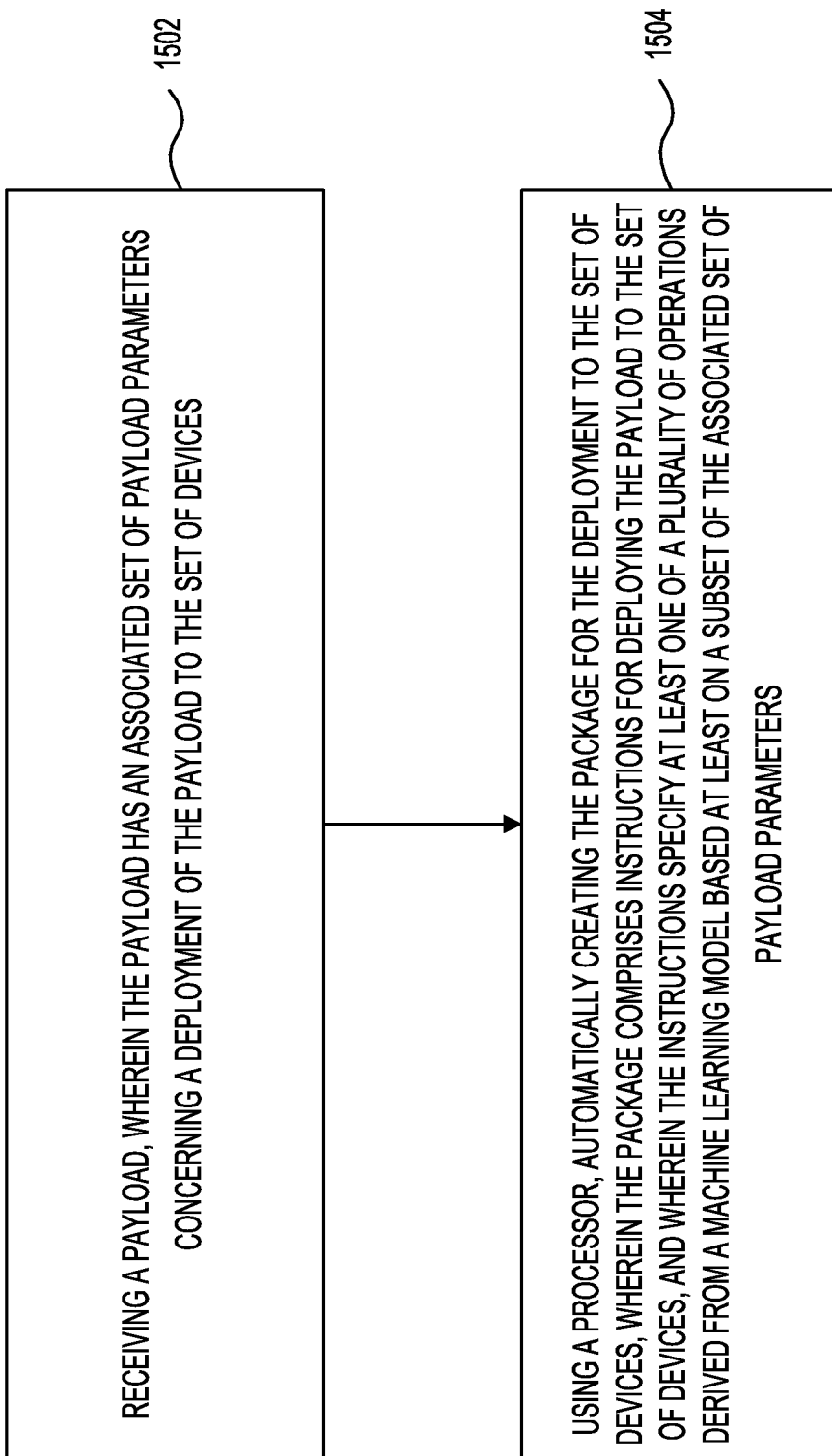
FIG. 15 shows a flow chart of a method for creating a package, including a payload, for deployment to a set of devices in accordance with one example.

FIG. 15 shows a flow chart 1500 of a method for creating a package, including a payload, for deployment to a set of devices in accordance with one example. Step 1502 may include receiving a payload, where the payload has an associated set of payload parameters concerning a deployment of the payload to the set of devices. As explained earlier, the payload may be received via a submission portal or another way. The payload parameters may be payload parameters 1450 as explained with respect to FIG. 14.

Step 1504 may include using a processor, automatically creating the package for the deployment to the set of devices, where the package comprises instructions for deploying the payload to the set of devices, and where the instructions specify at least one of a plurality of operations derived from a machine learning model based at least on a subset of the associated set of payload parameters. In this example, processor 1302 may execute instructions (e.g., instructions corresponding to learning-based analyzer 1410) stored in memory 1306 to perform this step. The instructions for deploying the payload may specify operations such as the number of gates and/or watchdogs required for the deployment. The operations may relate to any of the deployment parameters (e.g., deployment parameters 1470 of FIG. 14) related to deployment of the package to the set of devices. As an example, the operations may specify the deployment schedule and scope, including the rollout plan. The operations may also include health monitoring information for the package deployment. The health monitoring information may include what to monitor and the trigger thresholds associated with the monitored information.

In one example, the automatically creating the package for the deployment to the set of devices may include processing metadata, or other submission parameters, associated with the payload. The machine learning model may be trained based on training data comprising a mapping between the at least the subset of the associated set of payload parameters and a set of labels classifying an impact of deploying the payload to the set of devices. In one example, the set of labels may include a first label classifying the impact as impactful and a second label classifying the impact as impact-less. Any of the ML models 1430 described with respect to FIG. 14 may be trained and used as explained earlier.

Figure 16:
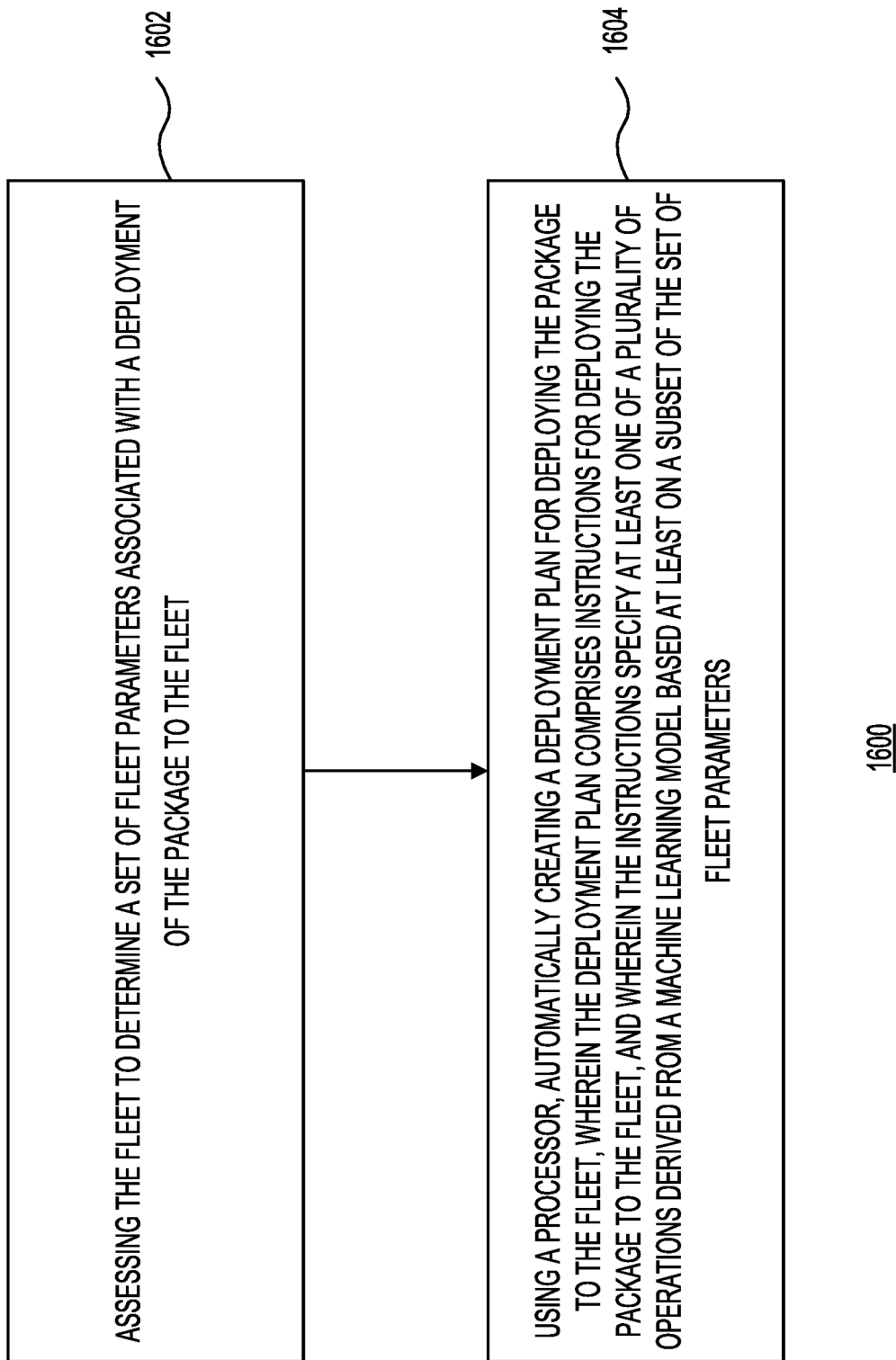
FIG. 16 shows a flow chart of a method for deploying a package to a fleet in accordance with one example.

FIG. 16 shows a flow chart 1600 of a method for deploying a package to a fleet in accordance with one example. Step 1602 may include assessing the fleet to determine a set of fleet parameters associated with a deployment of the package to the fleet. In this example, processor 1302 may execute instructions (e.g., instructions corresponding to learning-based analyzer 1410) stored in memory 1306 to perform this step. Assessing the fleet may comprise processing metadata associated with the fleet. The metadata may include information concerning the usage and the composition of the fleet. The metadata may be stored in deployment database 412 of FIG. 4. In one example, assessing the fleet may further include scanning the hardware associated with the fleet as explained with respect to FIGS. 11A and 11B earlier.

Step 1604 may include using a processor, automatically creating a deployment plan for deploying the package to the fleet, where the deployment plan comprises instructions for deploying the package to the fleet, and where the instructions specify at least one of a plurality of operations derived from a machine learning model based at least on a subset of the set of fleet parameters. In this example, processor 1302 may execute instructions (e.g., instructions corresponding to learning-based analyzer 1410) stored in memory 1306 to perform this step. The machine learning model may be trained based on training data comprising a mapping between the at least the subset of the fleet parameters and at least one label related to the deployment plan. In addition, the machine learning model may be trained based on feedback concerning the deployment of the package to the fleet. The plurality of operations may include actions corresponding to monitoring the deployment of the package to the fleet. Thus, as explained earlier, a deployment monitor may monitor the deployment to the fleet. Additional details concerning the deployment monitor are provided with respect to deployment monitor 512 of FIG. 5. The operations may include information concerning what to monitor and the trigger thresholds associated with the monitored information. In addition, the operations may include actions corresponding to generating information regarding a minimum scanning tree comprising a set of devices in the fleet. Additional details concerning generating information regarding a minimum scanning tree are provided with respect to FIGS. 11A and 11B.

In one example, the rollout of the package across the fleet may be staged in a manner that has minimal impact on customer workloads. Thus, first the package may be deployed to empty nodes (e.g., nodes that are not hosting any workloads). Next, the package may be deployed to those nodes that have the minimal number (e.g., two) of workloads (e.g., determined based on the container count or the number of virtual machines being supported by the node). Next, the package may be deployed to those nodes that have a slightly higher number of workloads and so on. This may limit the blast radius and help contain any harm to customer workloads if the deployment causes disruption to the hardware's functioning.

A logical reporting service may also be implemented to keep track of the deployment in real time. This service may access data stored in deployment database 412 of FIG. 4 and data stored in other sources and generate reports automatically. The reporting service may be implemented using a business analytics tool, such as Microsoft® Power BI. A deployment dashboard may also be implemented.

Figure 17:
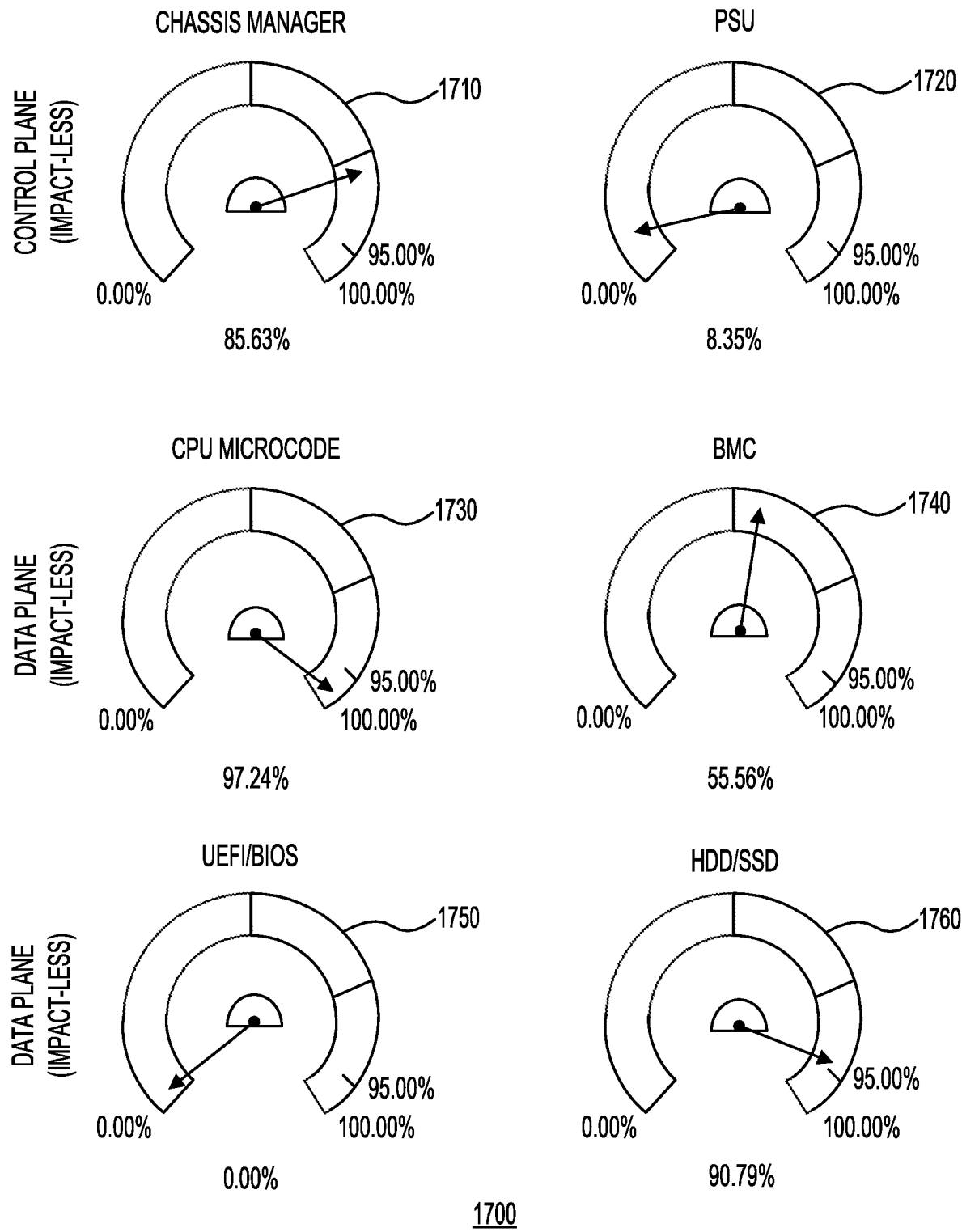
FIG. 17 shows a deployment dashboard in accordance with one example.

FIG. 17 shows a deployment dashboard 1700 in accordance with one example. Deployment dashboard 1700 includes information concerning the current state of the fleet with respect to the deployment of the various package types. The information may be displayed and tracked in real time. The information concerning the current state of the fleet may be stored in deployment database 412 of FIG. 4 and may be retrieved and displayed via deployment dashboard 1700 by deployment monitor 512 of FIG. 5. In this example, deployment dashboard 1700 may include freshness information indicative of the current state of fleet with respect to the deployment of certain package types. In this example, deployment dashboard 1700 may include gauges representing the state of the current fleet by package type. Deployment dashboard 1700 may also indicate whether the gauges relate to the control plane devices or the data plane devices. In addition, deployment dashboard 1700 may indicate that the deployments being tracked are impact-less or impactful. Thus, gauge 1710 may indicate the current state of the deployment of the packages related to the chassis manager. Gauge 1720 may indicate the current state of the deployment of the packages related to the power supply unit (PSU). Gauge 1730 may indicate the current state of the deployment of the packages related to the CPU microcode. Gauge 1730 may indicate the current state of the deployment of the packages related to the CPU microcode. Gauge 1740 may indicate the current state of the deployment of the packages related to the baseband management controller (BMC). Gauge 1750 may indicate the current state of the deployment of the packages related to the UEFI/BIOS. Gauge 1760 may indicate the current state of the deployment of the packages related to the HDD/SDD. Although FIG. 17 shows deployment dashboard 1700 having a certain number of gauges organized in a certain manner, deployment dashboard 1700 may include additional or fewer gauges that may be organized differently. As an example, deployment dashboard 1700 may include gauges to track other package types, including, for example, FPGA platform, FPGA image, Network Interface Controllers (NICs), Top-of-Rack (TOR) switches, Middle-of-Rack (MOR) switches, routers, power distribution units (PDUs), and rack level uninterrupted power supply (UPS) systems.

In addition, other dashboards may be provided, including dashboards to track each active deployment. Each such dashboard may display the progress of the deployment, including the current deployment rate and the estimated time of completion. Aside from active deployments, pending deployments may also be displayed. For a pending deployment, the dashboard may include the status of the deployment, such as submitted, packaging, testing, waiting, aborted, or completed. Additional details regarding each deployment (active or pending) may be made available by the deployment monitor (e.g., deployment monitor 512 of FIG. 5). In addition to the dashboards, deployment monitor 512 may further provide reporting regarding the key results, such as deployment safety, deployment time, detection efficiency, deployment impact, and deployment parallelism.

In conclusion, the present disclosure relates to a method for deploying a package to a set of devices in a fleet comprising hardware configurable to perform functions related to customer workloads. The method may include first scanning hardware in a first stage to determine whether a selected diversity target for deploying the package is met, where the first stage comprises hardware configured to handle functions unrelated to the customer workloads. The method may further include, if the selected diversity target for deploying the package is met after the first scanning, then using a processor, deploying the package to a first subset of the set of devices in the first stage based on instructions associated with the package. The method may further include, if the selected diversity target for deploying the package is not met after the first scanning, then scanning hardware in a second stage to determine whether the selected diversity target for deploying the package is met, where the second stage comprises hardware configured to handle at least a subset of the customer workloads. The method may further include, if the selected diversity target for deploying the package is met after the scanning, then using the processor, deploying the package to the first subset of the set of devices in the first stage and to a second subset of the set of devices in the second stage based on the instructions associated with the package.

The method may further include scanning the hardware in the fleet to obtain information about the hardware and storing the information about the hardware in a database. The method may further include classifying the hardware in the fleet into deployment categories by volume. The method may further include generating a first information regarding a first minimum scanning tree comprising the first subset of the set of devices. The method may further include generating a second information regarding a second minimum scanning tree comprising the second subset of the set of devices.

The fleet may comprise a predetermined number of types of the set of devices including a first type of devices, and wherein the selected diversity target specifies a percentage of the first type of devices. The method may further include if the selected diversity target for deploying the package is not met after the scanning, then continuing to scan any remaining stages until the selected diversity target for deploying the package is met or all of the remaining stages have been scanned.

In another example, the present disclosure relates to a method for deploying a package to a set of devices in a fleet comprising hardware configurable to perform functions related to customer workloads. The method may include first scanning hardware in a first stage to determine whether a selected diversity target for deploying the package is met, where the first stage comprises hardware configured to not handle any workloads. The method may further include, if the selected diversity target for deploying the package is not met after the first scanning, then scanning hardware in a second stage to determine whether the selected diversity target for deploying the package is met, where the second stage comprises hardware configured to handle a first selected number of the customer workloads. The method may further include, if the selected diversity target for deploying the package is not met after the scanning, then scanning a third stage to determine whether the selected diversity target for deploying the package is met, where the third stage comprises hardware configured to handle a second selected number of the customer workloads, where the second selected number is greater than the first selected number. The method may further include, if the selected diversity target for deploying the package is met after scanning the third stage, using the processor, deploying the package to a first subset of the set of devices in the first stage, a second subset of the set of devices in the second stage, and a third subset of the set of devices in the third stage based on the instructions associated with the package.

The method may further include scanning the hardware in the fleet to obtain information about the hardware and storing the information about the hardware in a database. The method may further include classifying the hardware in the fleet into deployment categories by volume. The method may further include generating a first information regarding a first minimum scanning tree comprising the first subset of the set of devices.

The method may further include generating a second information regarding a second minimum scanning tree comprising the second subset of the set of devices. The method may further include generating a third information regarding a third minimum scanning tree comprising the third subset of the set of devices. The method may further include if the selected diversity target for deploying the package is not met after the scanning, then continuing to scan any remaining stages until the selected diversity target for deploying the package is met or all of the remaining stages have been scanned.

In yet another example, the present disclosure relates to a system for deploying a package to a set of devices in a fleet comprising hardware configurable to perform functions related to customer workloads. The system may be configured to first scan hardware in a first stage to determine whether a selected diversity target for deploying the package is met, where the first stage comprises hardware configured to handle functions unrelated to the customer workloads. The system may further be configured to, if the selected diversity target for deploying the package is met after the first scan, then deploy the package to a first subset of the set of devices in the first stage based on instructions associated with the package. The system may further be configured to, if the selected diversity target for deploying the package is not met after the first scan, then scan hardware in a second stage to determine whether the selected diversity target for deploying the package is met, where the second stage comprises hardware configured to handle at least a subset of the customer workloads. The system may further be configured to, if the selected diversity target for deploying the package is met after the scan, then deploy the package to the first subset of the set of devices in the first stage and to a second subset of the set of devices in the second stage based on the instructions associated with the package.

The system may further be configured to scan the hardware in the fleet to obtain information about the hardware and storing the information about the hardware in a database. The system may further be configured to classify the hardware in the fleet into deployment categories by volume. The system may further be configured to generate a first information regarding a first minimum scanning tree comprising the first subset of the set of devices.

The system may further be configured to generate a second information regarding a second minimum scanning tree comprising the second subset of the set of devices. The system may further be configured to, if the selected diversity target for deploying the package is not met after the scanning, then continuing to scan any remaining stages until the selected diversity target for deploying the package is met or all of the remaining stages have been scanned.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for deploying a package to a set of devices in a fleet comprising hardware configurable to perform functions related to customer workloads, the method comprising:
    first scanning hardware in a first stage to determine whether a selected diversity target for deploying the package is met, wherein the first scanning further comprises generating a first information regarding a first minimum scanning tree comprising a first subset of a set of devices in the first stage, wherein the first stage comprises hardware configured to handle functions unrelated to the customer workloads, and wherein the selected diversity target is based on at least a package type associated with the package and a type of impact associated with the package;
    if the selected diversity target for deploying the package is met after the first scanning, then using a processor, deploying the package to at least the first subset of the set of devices in the first stage based on instructions associated with the package;
    if the selected diversity target for deploying the package is not met after the first scanning, then second scanning hardware in a second stage to determine whether the selected diversity target for deploying the package is met, wherein the second stage comprises hardware configured to handle at least a subset of the customer workloads; and
    if the selected diversity target for deploying the package is met after the second scanning, then using the processor, deploying the package to the first subset of the set of devices in the first stage and to a second subset of the set of devices in the second stage based on the instructions associated with the package.

2. The method of claim 1 further comprising scanning the hardware in the fleet to obtain information about the hardware and storing the information about the hardware in a database; wherein the information includes at least the package type associated with the package and the type of impact associated with the package.

3. The method of claim 1 further comprising classifying the hardware in the fleet into deployment categories by volume.

4. The method of claim 1 further comprising generating a second information regarding a second minimum scanning tree comprising the second subset of the set of devices.

5. The method of claim 1, wherein the fleet comprises a predetermined number of types of the set of devices including a first type of devices, and wherein the selected diversity target specifies a percentage of the first type of devices.

6. The method of claim 1 further comprising, if the selected diversity target for deploying the package is not met after the second scanning, then continuing to scan any remaining stages until the selected diversity target for deploying the package is met or all of the remaining stages have been scanned.

7. A method for deploying a package to a set of devices in a fleet comprising hardware configurable to perform functions related to customer workloads, the method comprising:
    first scanning hardware in a first stage to determine whether a selected diversity target for deploying the package is met, wherein the first scanning further comprises generating a first information regarding a first minimum scanning tree comprising a first subset of a set of devices in the first stage, wherein the first stage comprises hardware configured to not handle any workloads, and wherein the selected diversity target is based on at least a package type associated with the package and a type of impact associated with the package;
    if the selected diversity target for deploying the package is not met after the first scanning, then second scanning hardware in a second stage to determine whether the selected diversity target for deploying the package is met, wherein the second stage comprises hardware configured to handle a first selected number of the customer workloads;
    if the selected diversity target for deploying the package is not met after the second scanning, then third scanning a third stage to determine whether the selected diversity target for deploying the package is met, wherein the third stage comprises hardware configured to handle a second selected number of the customer workloads, wherein the second selected number is greater than the first selected number; and
    if the selected diversity target for deploying the package is met after third scanning the third stage, using the processor, deploying the package to at least the first subset of the set of devices in the first stage, a second subset of the set of devices in the second stage, and a third subset of the set of devices in the third stage based on the instructions associated with the package.

8. The method of claim 7 further comprising scanning the hardware in the fleet to obtain information about the hardware and storing the information about the hardware in a database.

9. The method of claim 7 further comprising classifying the hardware in the fleet into deployment categories by volume.

10. The method of claim 7 further comprising generating a second information regarding a second minimum scanning tree comprising the second subset of the set of devices.

11. The method of claim 10 further comprising generating a third information regarding a third minimum scanning tree comprising the third subset of the set of devices.

12. The method of claim 7 further comprising, if the selected diversity target for deploying the package is not met after the third scanning, then continuing to scan any remaining stages until the selected diversity target for deploying the package is met or all of the remaining stages have been scanned.

13. A system for deploying a package to a set of devices in a fleet comprising hardware configurable to perform functions related to customer workloads, wherein the system comprises at least one processor and a set of instructions stored in at least one memory, the set of instructions when executed by the at least one processor, configured to:
    first scan hardware in a first stage to determine whether a selected diversity target for deploying the package is met, wherein at least a first subset of the set of instructions is further configured to generate a first information regarding a first minimum scanning tree comprising a first subset of a set of devices in the first stage, wherein the first stage comprises hardware configured to handle functions unrelated to the customer workloads, and wherein the selected diversity target is based on at least a package type associated with the package and a type of impact associated with the package;

if the selected diversity target for deploying the package is met after the first scan, then deploy the package to at least the first subset of the set of devices in the first stage based on instructions associated with the package;

if the selected diversity target for deploying the package is not met after the first scan, then second scan hardware in a second stage to determine whether the selected diversity target for deploying the package is met, wherein the second stage comprises hardware configured to handle at least a subset of the customer workloads; and if the selected diversity target for deploying the package is met after the second scan, then deploy the package to the first subset of the set of devices in the first stage and to a second subset of the set of devices in the second stage based on the instructions associated with the package.

14. The system of claim 13, wherein at least a second subset of the set of instructions is further configured to scan the hardware in the fleet to obtain information about the hardware and store the information about the hardware in a database.

15. The system of claim 13, wherein at least a second subset of the set of instructions is further configured to classify the hardware in the fleet into deployment categories by volume.

16. The system of claim 13, wherein at least a second subset of the set of instructions is further configured to generate a second information regarding a second minimum scanning tree comprising the second subset of the set of devices.

17. The system of claim 16, wherein at least a third subset of the set of instructions is further configured to, if the selected diversity target for deploying the package is not met after the second scan, then continue to scan any remaining stages until the selected diversity target for deploying the package is met or all of the remaining stages have been scanned.

* * * * *